(12) United States Patent
Kitagawa et al.

(10) Patent No.: US 10,999,510 B2
(45) Date of Patent: May 4, 2021

(54) IMAGE SHAKE CORRECTION DEVICE, IMAGING DEVICE, IMAGE SHAKE CORRECTION METHOD, AND IMAGE SHAKE CORRECTION PROGRAM

(71) Applicant: FUJIFILM Corporation, Tokyo (JP)

(72) Inventors: Junya Kitagawa, Saitama (JP); Fuyuhiko Maeda, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/912,690

(22) Filed: Jun. 25, 2020

(65) Prior Publication Data

US 2020/0329201 A1 Oct. 15, 2020

Related U.S. Application Data

(63) Continuation of application No. PCT/JP2018/048303, filed on Dec. 27, 2018.

(30) Foreign Application Priority Data

Dec. 27, 2017 (JP) .............................. JP2017-252255

(51) Int. Cl.
*H04N 5/232* (2006.01)
*G03B 5/00* (2021.01)
*H04N 5/235* (2006.01)

(52) U.S. Cl.
CPC .......... *H04N 5/23287* (2013.01); *G03B 5/00* (2013.01); *H04N 5/2353* (2013.01); *H04N 5/23258* (2013.01)

(58) Field of Classification Search
CPC .......... H04N 5/23287; H04N 5/23258; H04N 5/2353; H04N 5/23248; H04N 5/3698;
(Continued)

(56) References Cited

U.S. PATENT DOCUMENTS 5,930,531 A 7/1999 Kitagawa et al.
5,978,600 A * 11/1999 Takeuchi ............. G02B 27/646
396/53
(Continued)

FOREIGN PATENT DOCUMENTS

JP H09-080541 A 3/1997
JP 2008-257211 A 10/2008
(Continued)

OTHER PUBLICATIONS

International Search Report issued in PCT/JP2018/048303; dated Feb. 5, 2019.
Written Opinion issued in PCT/JP2018/048303; dated Feb. 5, 2019.

*Primary Examiner* — Pritham D Prabhakher
(74) *Attorney, Agent, or Firm* — Studebaker & Brackett PC

(57) ABSTRACT

A digital camera (100) includes a plurality of drive units that moves a movable member (2) including an imaging element (20) in directions X, Y, and θ along a light receiving surface (20a) of the imaging element (20), and a system controller (108) that controls the plurality of drive units. The system controller (108) includes a power amount decision unit (108A) that decides power amounts to be supplied to the plurality of drive units for moving the movable member (2) to a target position, and a drive controller (108B) that performs a first control for reducing a total value of the power amounts decided by the power amount decision unit (108A) while maintaining a ratio between the power amounts decided by the power amount decision unit (108A) and supplying the power amounts after the reduction to the drive units.

17 Claims, 15 Drawing Sheets

(58) Field of Classification Search
CPC ......... H04N 5/23241; H04N 5/232411; H04N 1/00885; H04N 1/00888; H04N 1/00899; H04N 1/00904; H04N 1/00896; G03B 5/00; G03B 39/00; G03B 17/00
USPC ...................................................... 348/208.7
See application file for complete search history.

(56) References Cited

U.S. PATENT DOCUMENTS

| | | | | |
|---|---|---|---|---|
| 7,592,759 | B2* | 9/2009 | Shibatani | G05B 19/40 |
| | | | | 318/119 |
| 7,720,367 | B2* | 5/2010 | Uenaka | G03B 17/00 |
| | | | | 396/55 |
| 9,229,244 | B2* | 1/2016 | Nakayama | H04N 5/232411 |
| 9,826,165 | B2* | 11/2017 | Ozaki | H04N 5/23216 |
| 9,930,256 | B2* | 3/2018 | Ozaki | H04N 5/907 |
| 10,187,573 | B2* | 1/2019 | Dunn | H04N 5/23241 |
| 2006/0108964 | A1* | 5/2006 | Shibatani | G05B 19/40 |
| | | | | 318/685 |
| 2006/0170388 | A1* | 8/2006 | Nomura | H04N 5/232411 |
| | | | | 318/685 |
| 2007/0269195 | A1* | 11/2007 | Uenaka | H04N 5/2253 |
| | | | | 396/55 |
| 2008/0013937 | A1* | 1/2008 | Uenaka | H04N 5/23261 |
| | | | | 396/55 |
| 2008/0151065 | A1* | 6/2008 | Okumura | H04N 5/23287 |
| | | | | 348/208.4 |
| 2008/0226277 | A1 | 9/2008 | Uenaka et al. | |
| 2009/0295978 | A1* | 12/2009 | Yun | H04N 5/23203 |
| | | | | 348/335 |
| 2009/0316010 | A1* | 12/2009 | Nomura | H04N 5/23258 |
| | | | | 348/208.6 |
| 2014/0176742 | A1* | 6/2014 | Nakayama | H04N 5/23287 |
| | | | | 348/208.11 |
| 2015/0326787 | A1* | 11/2015 | Ozaki | H04N 5/23241 |
| | | | | 348/333.13 |
| 2017/0019596 | A1* | 1/2017 | Dunn | H04N 5/23293 |
| 2017/0126974 | A1* | 5/2017 | Ozaki | H04N 5/23293 |

FOREIGN PATENT DOCUMENTS

| | | |
|---|---|---|
| JP | 2008-268813 A | 11/2008 |
| JP | 2016-057328 A | 4/2016 |

* cited by examiner

IMAGE SHAKE CORRECTION DEVICE, IMAGING DEVICE, IMAGE SHAKE CORRECTION METHOD, AND IMAGE SHAKE CORRECTION PROGRAM

CROSS REFERENCE TO RELATED APPLICATION

This is a continuation of International Application No. PCT/JP2018/048303 filed on Dec. 27, 2018, and claims priority from Japanese Patent Application No. 2017-252255 filed on Dec. 27, 2017, the entire disclosures of which are incorporated herein by reference.

BACKGROUND OF THE INVENTION

1. Field of the Invention

The present invention relates to an image shake correction device, an imaging device, an image shake correction method, and a computer readable medium storing an image shake correction program.

2. Description of the Related Art

An imaging device comprising an imaging element that images a subject through an imaging optical system or a lens device used by being attached to the imaging device has an image shake correction function of correcting shake (hereinafter, referred to as image shake) of a captured image caused by vibration of the apparatus.

For example, in the lens device, image shake correction is performed by moving a correction lens included in an imaging optical system in a surface perpendicular to an optical axis such that the vibration of the apparatus is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imaging element on a surface perpendicular to an optical axis such that the vibration of the apparatus is detected based on information from a motion detection sensor such as an acceleration sensor or an angular velocity sensor mounted on the imaging device and the detected vibration is canceled.

JP2008-268813A describes an imaging device that performs image shake correction by moving a lens. In a case where a power supply voltage is equal to or lower than a specific voltage, the imaging device continues an anti-vibration operation by reducing a movable amount of the lens.

SUMMARY OF THE INVENTION

A plurality of actuators for moving a movable unit is provided at an image shake correction device that corrects image shake by moving an imaging element or a lens in a plurality of directions. In a case where the movable unit is moved to a target position, a power is distributed to the plurality of actuators at an optimal ratio in consideration of a smooth movement of the movable unit, a moving speed thereof, and utilization efficiency of the power.

However, in a case where a total power amount capable of being supplied to the plurality of actuators is reduced or in a case where it is desired to reduce the total power amount, for example, control for reducing the power amount of the actuator to which the largest power amount is supplied is simply performed, and thus, the aforementioned optimum ratio will be lost. As a result, unnecessary movement occurs in the movable unit, and this movement is recognized as the shake of the captured image caused regardless of the shake of the imaging device.

The imaging device described in JP2008-268813A suppresses power consumption by narrowing a movement range of the movable unit, but image shake correction performance cannot be sufficiently secured. JP2008-268813A does not consider a method of controlling the ratio of the power to be supplied to the plurality of actuators.

The present invention has been made in view of the aforementioned circumstances, and an object of the present invention is to provide an image shake correction device, an imaging device, an image shake correction method, and a computer readable medium storing an image shake correction program capable of maintaining image shake correction performance while reducing power consumption.

An image shake correction device of the present invention comprises a plurality of drive units that moves a movable unit including at least one of an imaging element or a lens arranged in association with the imaging element in a plurality of directions along a light receiving surface of the imaging element, and a controller that controls the plurality of drive units. The controller comprises a power amount decision unit that decides power amounts to be supplied to the plurality of drive units for moving the movable unit to a target position, and a drive controller that performs a first control for reducing a total value of the power amounts decided by the power amount decision unit while maintaining a ratio between the power amounts decided by the power amount decision unit, and supplying the power amounts after the reduction to the drive units. The drive controller performs the first control in a case where the total value exceeds a total power amount capable of being supplied to the plurality of drive units, and supplies the power amounts decided by the power amount decision unit to the drive units in a case where the total value is equal to or smaller than the total power amount. The drive controller performs control such that the total value is equal to or smaller than the total power amount by reducing at least one of the power amounts except for a minimum power amount of the power amounts decided by the power amount decision unit, and performs any one of a second control for supplying the power amounts after the reduction to the drive units and the first control in a case where the total value exceeds the total power amount.

An imaging device of the present invention comprises the image shake correction device.

An image shake correction method of the present invention comprises a control step of controlling a plurality of drive units that moves a movable unit including at least one of an imaging element or a lens arranged in association with the imaging element in a plurality of directions along a light receiving surface of the imaging element. The control step comprises a power amount decision step of deciding power amounts to be supplied to the plurality of drive units for moving the movable unit to a target position, and a drive control step of performing a first control for reducing a total value of the power amounts decided in the power amount decision step while maintaining a ratio between the power amounts decided in the power amount decision step, and supplying the power amounts after the reduction to the drive units. In the drive control step, the first control is performed in a case where the total value exceeds a total power amount capable of being supplied to the plurality of drive units, and the power amounts decided in the power amount decision step are supplied to the drive units in a case where the total value is equal to or smaller than the total power amount. In the drive control step, control is performed such that the total value is equal to or smaller than the total power amount by reducing at least one of the power amounts except for a minimum power amount of the power amounts decided in the power amount decision step, and any one of a second control for supplying the power amounts after the reduction to the drive units or the first control is performed in a case where the total value exceeds the total power amount.

A non-transitory computer readable medium storing an image shake correction program of the present invention causes a computer to execute a control step of controlling a plurality of drive units that moves a movable unit including at least one of an imaging element or a lens arranged in association with the imaging element in a plurality of directions along a light receiving surface of the imaging element. The control step comprises a power amount decision step of deciding power amounts to be supplied to the plurality of drive units for moving the movable unit to a target position, and a drive control step of performing a first control for reducing a total value of the power amounts decided in the power amount decision step while maintaining a ratio between the power amounts decided in the power amount decision step, and supplying the power amounts after the reduction to the drive units. In the drive control step, the first control is performed in a case where the total value exceeds a total power amount capable of being supplied to the plurality of drive units, and the power amounts decided in the power amount decision step are supplied to the drive units in a case where the total value is equal to or smaller than the total power amount. In the drive control step, control is performed such that the total value is equal to or smaller than the total power amount by reducing at least one of the power amounts except for a minimum power amount of the power amounts decided in the power amount decision step, and any one of a second control for supplying the power amounts after the reduction to the drive units or the first control is performed in a case where the total value exceeds the total power amount.

According to the present invention, it is possible to provide an image shake correction device, an imaging device, an image shake correction method, and a computer readable medium storing an image shake correction program capable of maintaining image shake correction performance while reducing power consumption.

DESCRIPTION OF THE PREFERRED EMBODIMENTS

Hereinafter, embodiments of the present invention will be described with reference to the drawings.

Figure 1:
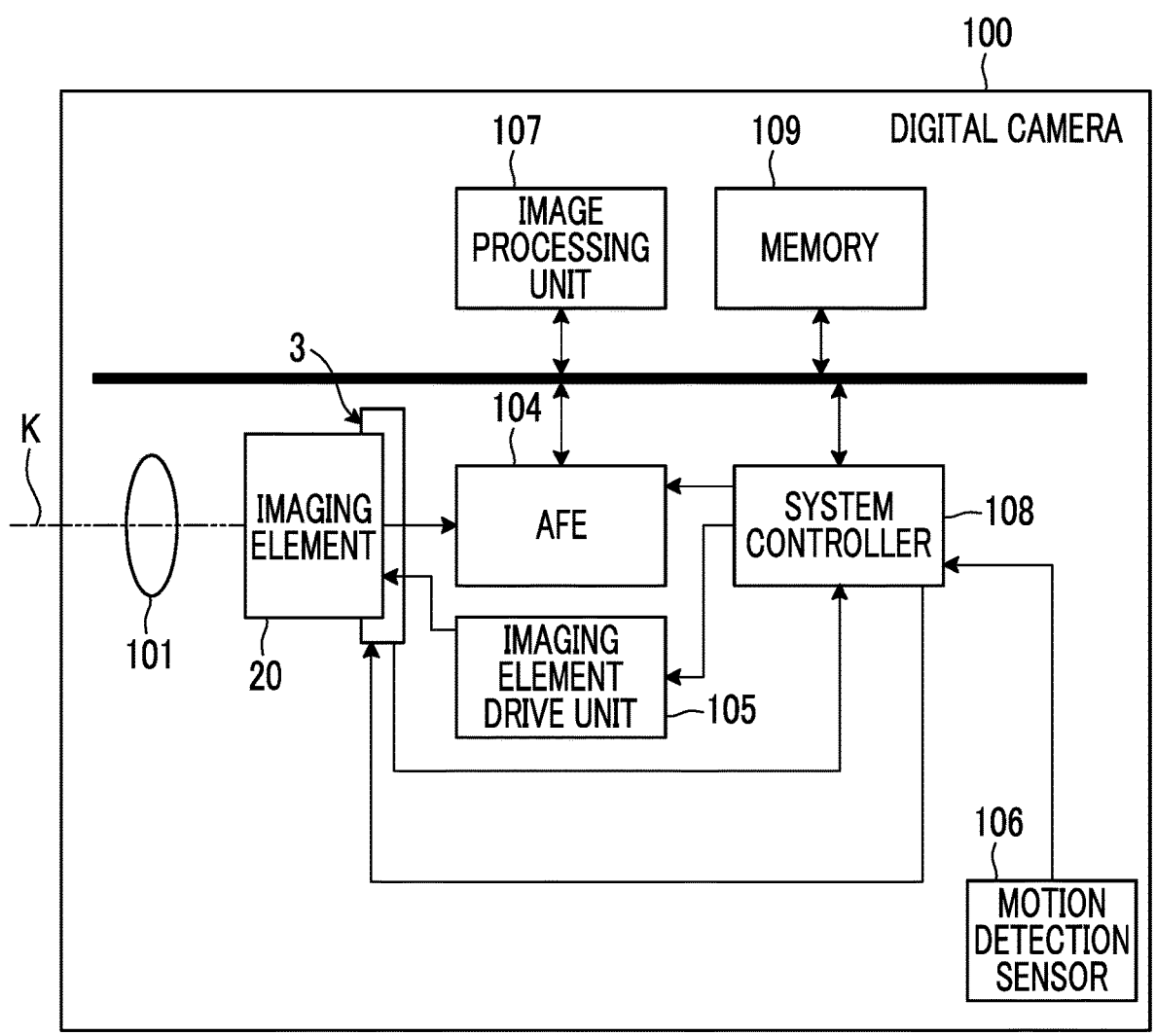
FIG. 1 is a diagram showing a schematic configuration of a digital camera 100 which is an embodiment of an imaging device of the present invention.

FIG. 1 is a diagram showing a schematic configuration of a digital camera 100 which is an embodiment of an imaging device of the present invention.

The digital camera 100 comprises an imaging lens 101, an imaging element 20, an image shake correction mechanism 3, an imaging element drive unit 105 that drives the imaging element 20, an analog front end (AFE) 104, an image processing unit 107, a motion detection sensor 106, a system controller 108 that performs overall control of the entire digital camera 100, and a memory 109.

The imaging lens 101 includes a focus lens or a zoom lens.

The imaging element 20 images a subject through the imaging lens 101, and comprises a semiconductor chip on which a charge coupled device (CCD) image sensor or a complementary metal oxide semiconductor (CMOS) image sensor is formed and a package that accommodates the semiconductor chip.

Figure 3:
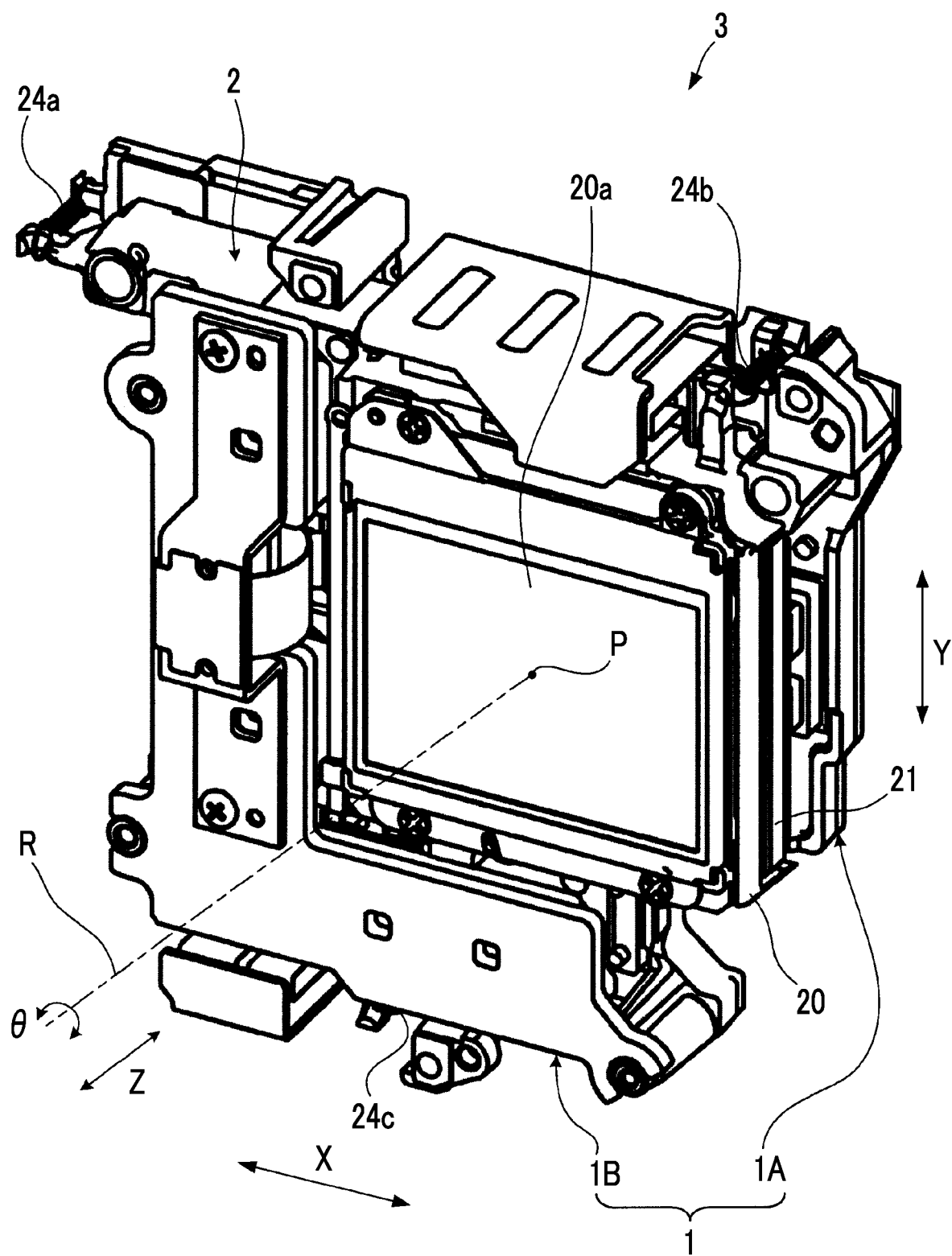
FIG. 3 is a perspective view showing an appearance configuration of the image shake correction mechanism 3 shown in FIGS. 1 and 2.

As shown in FIG. 3 to be described below, a light receiving surface 20a of the imaging element 20 has a rectangular shape.

The image shake correction mechanism 3 corrects image shake of a captured image captured by the imaging element 20 by moving the light receiving surface 20a of the imaging element 20 within a surface perpendicular to an optical axis K of the imaging lens 101.

In the present specification, in the digital camera 100, a state in which the light receiving surface 20a of the imaging element 20 is perpendicular to a gravity direction (a state in which the optical axis K is parallel to the gravity direction), and a state in which the image shake correction mechanism 3 is not energized are referred to as a reference state. In this reference state, a center P (see FIG. 3) of the light receiving surface 20a is located on the optical axis K.

Although the detailed configuration of the image shake correction mechanism 3 will be described below, the image shake is corrected by moving the imaging element 20 in three directions of a first direction which is a lateral direction (direction Y shown in FIG. 3) of the light receiving surface 20a of the imaging element 20 in the reference state, a second direction which is a longitudinal direction (direction X shown in FIG. 3) of the light receiving surface 20a of the imaging element 20 in the reference state, and a third direction which is a direction (direction θ shown in FIG. 3) along a circumference of a circle using the center P of the light receiving surface 20a of the imaging element 20 as a center.

The AFE 104 includes a signal processing circuit that performs correlative double sampling processing and digital conversion processing on imaging signals output from the imaging element 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imaging element drive unit 105 and the AFE 104 such that the subject is captured by the imaging element 20 and the imaging signal corresponding to a subject image is output from the imaging element 20.

The system controller 108 controls the image shake correction mechanism 3 based on movement information of the digital camera 100 detected by the motion detection sensor 106. The system controller 108 corrects the image shake of the captured image captured by the imaging element 20 by moving the light receiving surface 20a of the imaging element 20 in at least one of the direction X, the direction Y, or the direction θ.

The system controller 108 includes various processors that perform processing by executing a program including an image shake correction program.

As the various processors, a central processing unit (CPU) which is a general-purpose processor that executes various processing by executing programs, a programmable logic device (PLD) which is a processor capable of changing a circuit configuration after a field programmable gate array (FPGA) is manufactured, or a dedicated electrical circuit which is a processor having a circuit configuration specially designed to execute specific processing such as an application specific integrated circuit (ASIC).

More specifically, structures of these various processors are electric circuits in which circuit elements such as semiconductor elements are combined.

The system controller 108 may be constituted by one of various processors, or may be constituted by a combination of two or more processors of the same type or different types (for example, a combination of a plurality of FPGAs or a combination of a CPU and an FPGA).

The memory 109 includes a random access memory (RAM) and a read only memory (ROM). The ROM stores programs and various pieces of data necessary for an operation of the system controller 108.

Figure 2:
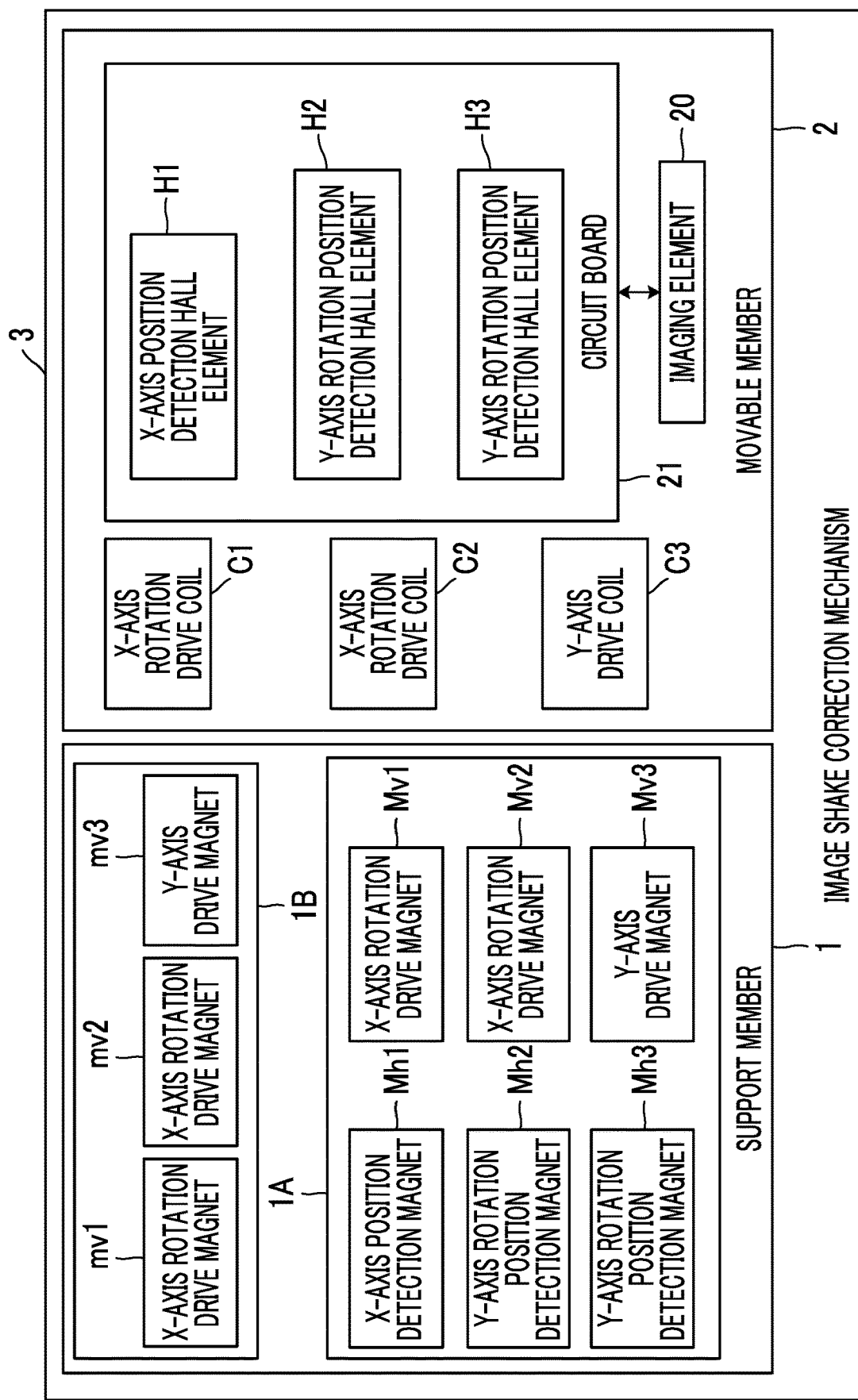
FIG. 2 is a diagram showing a schematic configuration of an image shake correction mechanism 3 in the digital camera 100 shown in FIG. 1.

FIG. 2 is a diagram showing a schematic configuration of the image shake correction mechanism 3 in the digital camera 100 shown in FIG. 1.

The image shake correction mechanism 3 comprises a movable member 2 movable in each of the directions X, Y, and θ, and a support member 1 that supports the movable member 2 to be movable in each of the directions X, Y, and θ.

A circuit board 21 on which the imaging element 20 is fixed (mounted), an X-axis rotation drive coil C1, an X-axis rotation drive coil C2, and a Y-axis drive coil C3 are fixed to the movable member 2. The movable member 2 forms a movable unit.

An X-axis position detection Hall element H1 that is a position detection element for detecting a position of the movable member 2 in the direction X, and a Y-axis rotation position detection Hall element H2 and a Y-axis rotation position detection Hall element H3 which are position detection elements for detecting positions of the movable member 2 in the direction Y and the direction θ are fixed to the circuit board 21.

Output signals of the X-axis position detection Hall element H1, the Y-axis rotation position detection Hall element H2, and the Y-axis rotation position detection Hall element H3 are input to the system controller 108.

The system controller 108 detects a position of the movable member 2 based on the output signals, moves the movable member 2 by controlling a control current flowing through the X-axis rotation drive coil C1, a control current flowing through the X-axis rotation drive coil C2, and a control current flowing through the Y-axis drive coil C3 such that the detected position matches a target position, and corrects the image shake.

The support member 1 includes a first support member 1A and a second support member 1B.

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the first support member 1A.

The X-axis rotation drive magnet mv1, the X-axis rotation drive magnet mv2, and the Y-axis drive magnet mv3 are fixed to the second support member 1B.

FIG. 3 is a perspective view showing an appearance configuration of the image shake correction mechanism 3 shown in FIGS. 1 and 2. FIG. 3 shows an appearance of the image shake correction mechanism 3 in the reference state.

As shown in FIG. 3, the image shake correction mechanism 3 comprises the support member 1 constituted by the first support member 1A and the second support member 1B and the movable member 2 to which the circuit board 21 on which the imaging element 20 is mounted is fixed. The movable member 2 is biased against the first support member 1A by springs 24a, 24b, and 24c which are elastic members.

This image shake correction mechanism 3 is fixed to the main body of the digital camera 100 in a state in which the light receiving surface 20a faces the imaging lens 101 shown in FIG. 1.

The image shake correction mechanism 3 corrects the image shake by moving the movable member 2 in the direction θ using, as a center, a rotation axis R (an axis which is parallel to the gravity direction and passes through the center P in the reference state) which is perpendicular to the light receiving surface 20a and passes through the center P of the light receiving surface 20a, the direction X which is the longitudinal direction of the light receiving surface 20a, and the direction Y which is the lateral direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ by the same angle.

Figure 4:
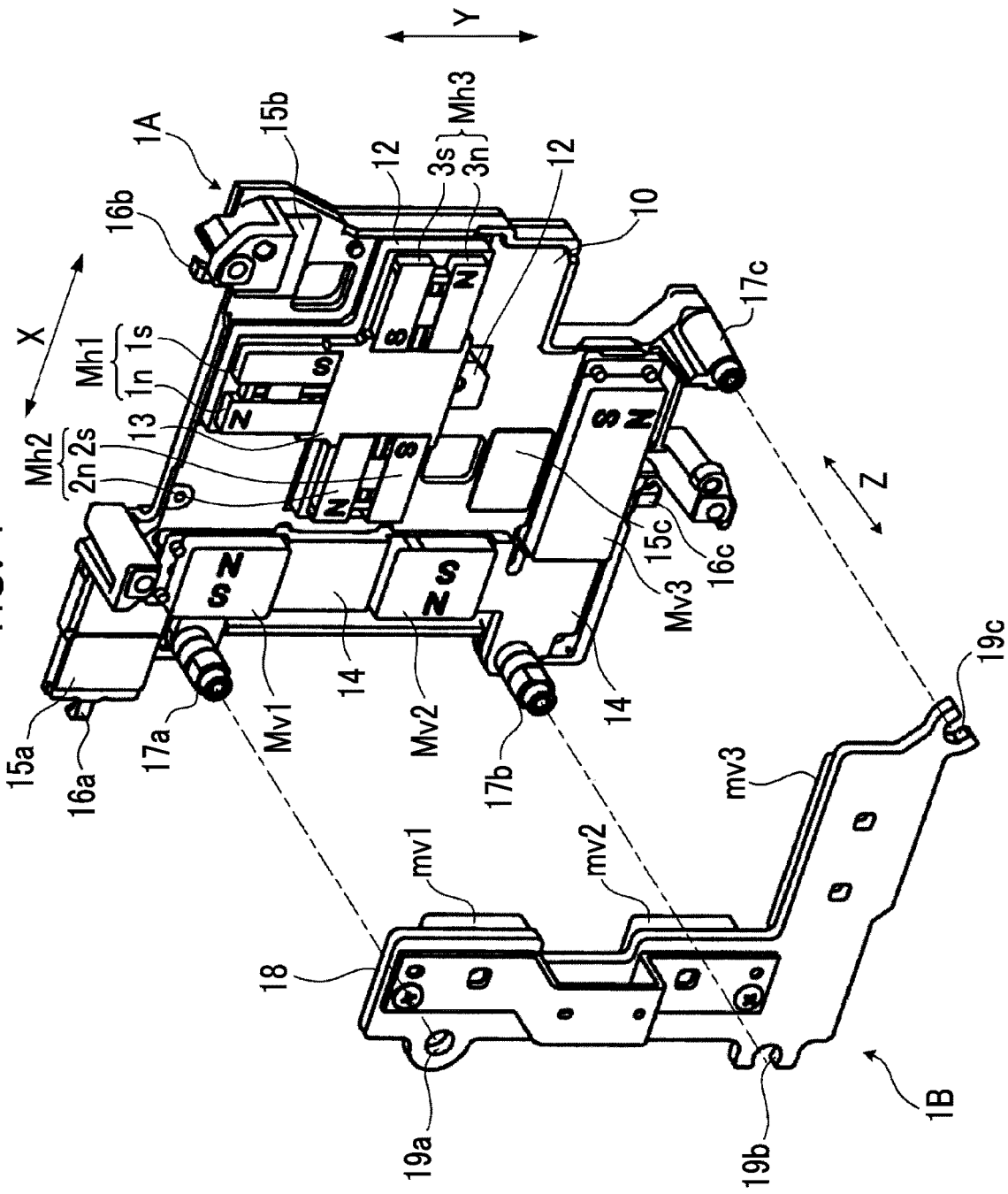
FIG. 4 is an exploded perspective view of a support member 1 in the image shake correction mechanism 3 shown in FIG. 3 is viewed from an imaging lens 101 side.

FIG. 4 is an exploded perspective view of the support member 1 in the image shake correction mechanism 3 shown in FIG. 3 as viewed from the imaging lens 101 side.

As shown in FIG. 4, the first support member 1A comprises a plate-like base 10 that is made of resin and has a flat surface perpendicular to the direction Z, and projecting portions 17a, 17b, and 17c extending in the direction Z from an edge part of the base 10 to the imaging lens 101 side.

The second support member 1B has a substantially L-shaped yoke 18 as viewed from the imaging lens 101 side. A hole portion 19a and notch portions 19b and 19c at positions facing the projecting portions 17a, 17b and 17c are formed at the yoke 18.

In a state in which the movable member 2 is disposed between the first support member 1A and the second support member 1B, the projecting portion 17a of the first support member 1A is fixed by being fitted into the hole portion 19a of the second support member 1B, the projecting portion 17b of the first support member 1A is fixed by being fitted into the notch portion 19b of the second support member 1B, and the projecting portion 17c of the first support member 1A is fixed by being fitted into the notch portion 19c of the second support member 1B. Accordingly, the movable member 2 is supported by the support member 1.

As shown in FIG. 4, substantially L-shaped yokes 14 as viewed from the imaging lens 101 side are formed at a left end portion in the direction X and a lower end portion in the direction Y as viewed from the imaging lens 101 side on a surface of the base 10 on the imaging lens 101 side.

The X-axis rotation drive magnet Mv1 and the X-axis rotation drive magnet Mv2 are arranged and fixed on a front surface of portions of the yokes 14 of the first support member 1A that extends along the direction Y with a space in the direction Y.

The Y-axis drive magnet Mv3 is fixed on a front surface of a portion of the yoke 14 of the first support member 1A that extends along the direction X.

Figure 6:
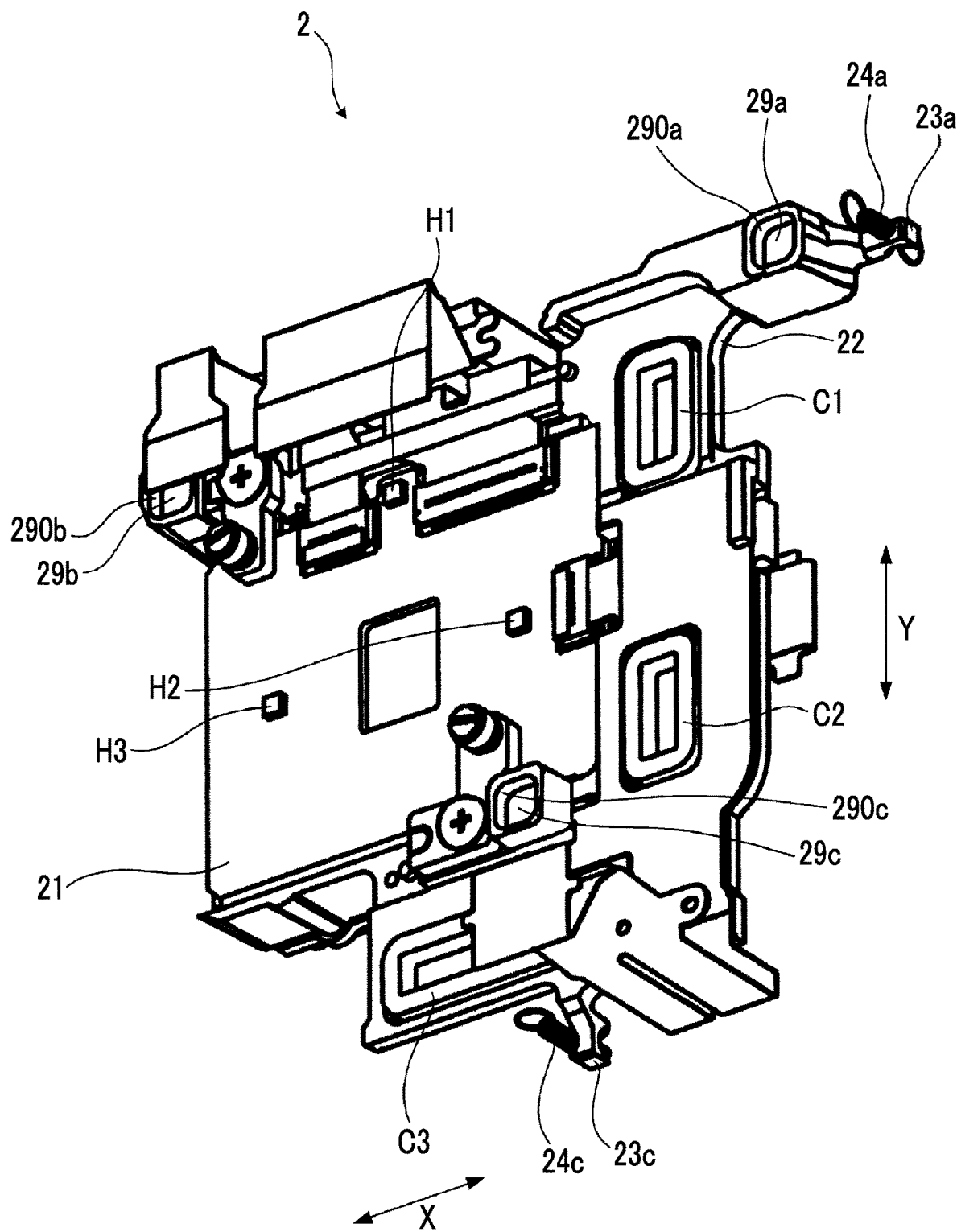
FIG. 6 is a perspective view of the movable member 2 shown in FIG. 5 as viewed from the side opposite to the imaging lens 101 side.

As shown in FIG. 4, the X-axis rotation drive magnet mv1 is fixed on a front surface of the yoke 18 of the second support member 1B on the first support member 1A side at a position facing the X-axis rotation drive magnet Mv1 of the first support member 1A with the X-axis rotation drive coil C1 of the movable member 2 described in FIG. 6 interposed therebetween.

As shown in FIG. 4, the X-axis rotation drive magnet mv2 is fixed on a front surface of the yoke 18 of the second support member 1B on the first support member 1A side at a position facing the X-axis rotation drive magnet Mv2 of the first support member 1A with the X-axis rotation drive coil C2 of the movable member 2 described in FIG. 6 interposed therebetween.

As shown in FIG. 4, the Y-axis drive magnet mv3 is fixed on a front surface of the yoke 18 of the second support member 1B on the first support member 1A side at a position facing the Y-axis drive magnet Mv3 with the Y-axis drive coil C3 of the movable member 2 described in FIG. 6 interposed therebetween.

As shown in FIG. 4, substantially plus-shaped yokes 12 as viewed in the direction Z are formed at a portion facing the circuit board 21 fixed to the movable member 2 described in FIG. 6 on a surface of the imaging lens 101 side of the base 10 of the first support member 1A.

The X-axis position detection magnet Mh1 is fixed on a front surface of the yoke 12 at a position facing the X-axis position detection Hall element H1 (see FIG. 6 to be described below) fixed to the circuit board 21 fixed to the movable member 2.

The Y-axis rotation position detection magnet Mh2 is fixed on the front surface of the yoke 12 at a position facing the Y-axis rotation position detection Hall element H2 (see FIG. 6 to be described below) fixed to the circuit board 21 fixed to the movable member 2.

The Y-axis rotation position detection magnet Mh3 is fixed on the front surface of the yoke 12 at a position facing the Y-axis rotation position detection Hall element H3 (see FIG. 6 to be described below) fixed to the circuit board 21 fixed to the movable member 2.

In the example shown in FIG. 4, the X-axis position detection magnet Mh1, the Y-axis rotation position detection magnet Mh2, and the Y-axis rotation position detection magnet Mh3 are coupled and integrated by a coupling member 13. Since the coupling member 13 is fixed to the yoke 12, the X-axis position detection magnet Mh1, the Y-axis rotation position detection magnet Mh2, and the Y-axis rotation position detection magnet Mh3 are fixed to the first support member 1A.

As shown in FIG. 4, three flat surfaces 15a, 15b, and 15c perpendicular to the direction Z are formed on the surface of the imaging lens 101 side of the base 10. The positions of the flat surfaces 15a, 15b, and 15c in the direction Z are all the same, and these flat surfaces are all formed on the same flat surface.

A hook 16a extending in the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

Figure 5:
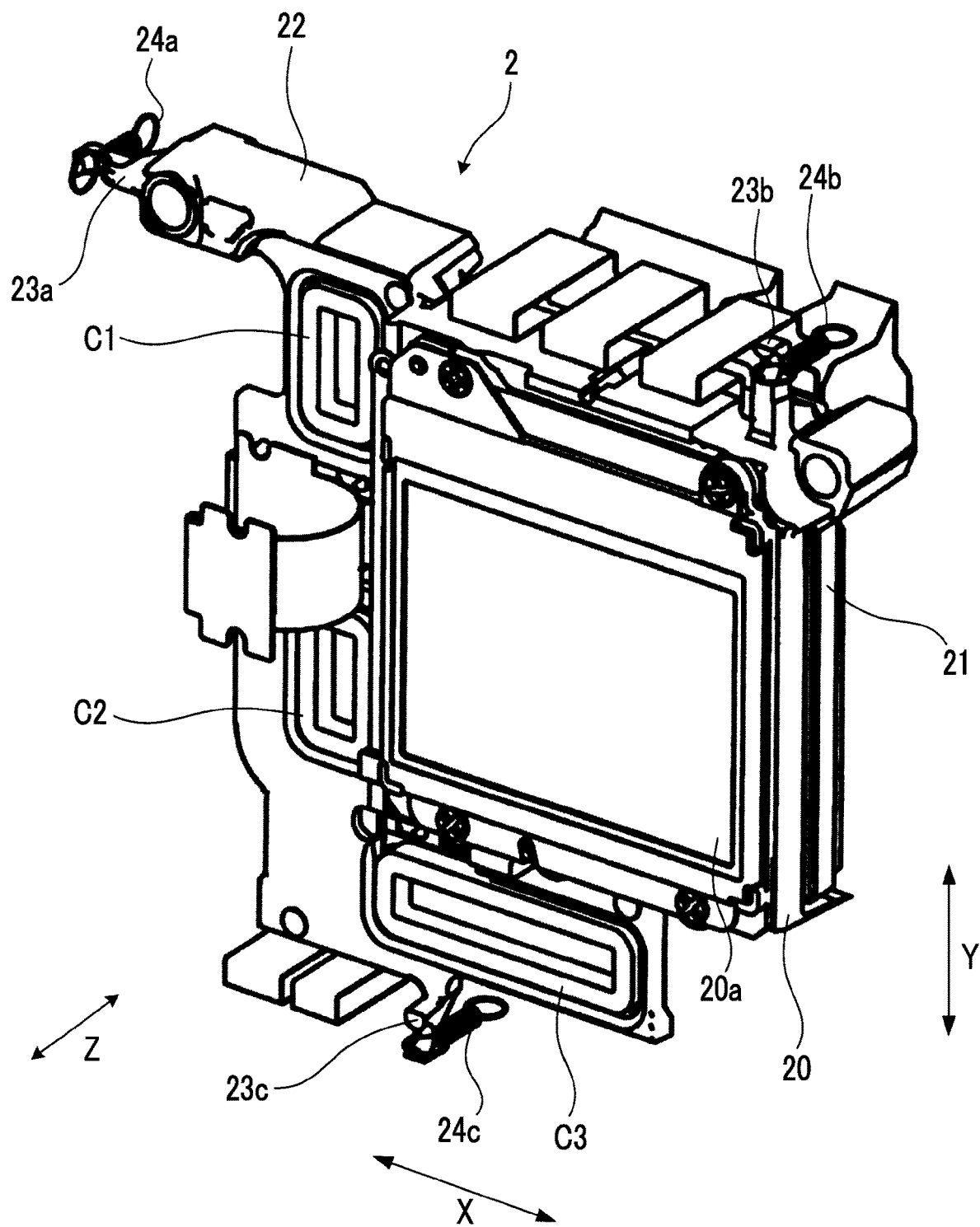
FIG. 5 is a perspective view of a movable member 2 in the image shake correction mechanism 3 shown in FIG. 3 as viewed from the imaging lens 101 side.

FIG. 5 is a perspective view of the movable member 2 in the image shake correction mechanism 3 shown in FIG. 3 as viewed from the imaging lens 101 side.

FIG. 6 is a perspective view of the movable member 2 shown in FIG. 5 as viewed from the side opposite to the imaging lens 101 side.

The movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging lens 101 side.

As shown in FIGS. 5 and 6, the circuit board 21 on which the imaging element 20 is mounted is fixed to the base 22 with an adhesive at a portion facing a region surrounded by the three portions.

As shown in FIGS. 5 and 6, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 5 and 6 and the X-axis rotation drive magnets Mv1 and mv1 shown in FIG. 4 constitute an X-axis rotation drive first voice coil motor (VCM).

The X-axis rotation drive coil C2 shown in FIGS. 5 and 6 and the X-axis rotation drive magnets Mv2 and mv2 shown in FIG. 4 constitute an X-axis rotation drive second VCM.

The first VCM and the second VCM moves the movable member 2 in the direction X by an electromagnetic induction action between the X-axis rotation drive coil C1 and the X-axis rotation drive magnets Mv1 and mv1 and an electromagnetic induction action between the X-axis rotation drive coil C2 and the X-axis rotation drive magnets Mv2 and mv2 by causing the control currents to flow through the X-axis rotation drive coil C1 and the X-axis rotation drive coil C2 in opposite direction to each other.

The first VCM and the second VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction action between the X-axis rotation drive coil C2 and the X-axis rotation drive magnets Mv2 and mv2 by causing the control currents to flow through the X-axis rotation drive coil C1 and the X-axis rotation drive coil C2 in the same direction.

The Y-axis drive coil C3 shown in FIGS. 5 and 6 and the Y-axis drive magnets Mv3 and mv3 shown in FIG. 4 constitute a Y-axis drive third VCM.

The third VCM moves the movable member 2 in the direction Y by an electromagnetic induction action between the Y-axis drive coil C3 and the Y-axis drive magnets Mv3 and mv3 by causing the control current to flow through the Y-axis drive coil C3.

The first VCM, the second VCM, and the third VCM each constitute a drive unit. The control current flowing through each of the drive coils of the first VCM, the second VCM, and the third VCM is controlled by the system controller 108 of FIG. 1. The system controller 108 functions as a controller that controls these three drive units. These three drive units and the system controller 108 constitute an image shake correction device.

As shown in FIG. 6, the X-axis position detection Hall element H1 is fixed at a position facing the intermediate position between the S-pole 1s and the N-pole 1n of the X-axis position detection magnet Mh1 on a surface of the first support member 1A side of the circuit board 21 fixed to the base 22 (hereinafter, referred to as a rear surface of the circuit board 21).

The Y-axis rotation position detection Hall element H2 is fixed at a position facing the intermediate position between the S-pole 2s and the N-pole 2n of the Y-axis rotation position detection magnet Mh2 on the rear surface of the circuit board 21.

The Y-axis rotation position detection Hall element H3 is fixed at a position facing the intermediate position between the S-pole 3s and the N-pole 3n of the Y-axis rotation position detection magnet Mh3 on the rear surface of the circuit board 21.

The X-axis position detection Hall element H1 outputs, as magnetic field information, a signal corresponding to a magnetic field supplied from the X-axis position detection magnet Mh1, and the system controller 108 detects a position of the movable member 2 in the direction X by an output change of this signal.

The Y-axis rotation position detection Hall element H2 outputs, as magnetic field information, a signal corresponding to a magnetic field supplied from the Y-axis rotation position detection magnet Mh2, and the system controller 108 detects a position of the movable member 2 in the direction Y by an output change of this signal.

The Y-axis rotation position detection Hall element H3 outputs, as magnetic field information, a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

As shown in FIG. 6, a recess portion 290a that accommodates a rolling element (spherical ball) for causing the movable member 2 to be movable on a surface perpendicular to the direction Z at a position facing the flat surface 15a of the first support member 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the first support member 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the first support member 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface.

The movable member 2 moves on the flat surface perpendicular to the direction Z by rolling the rolling elements disposed between the bottom surface 29a of the movable member 2 and the flat surface 15a of the first support member 1A, between the bottom surface 29b of the movable member 2 and the flat surface 15b of the first support member 1A, and between the bottom surface 29c of the movable member 2 and the flat surface 15c of the first support member 1A.

Figure 7:
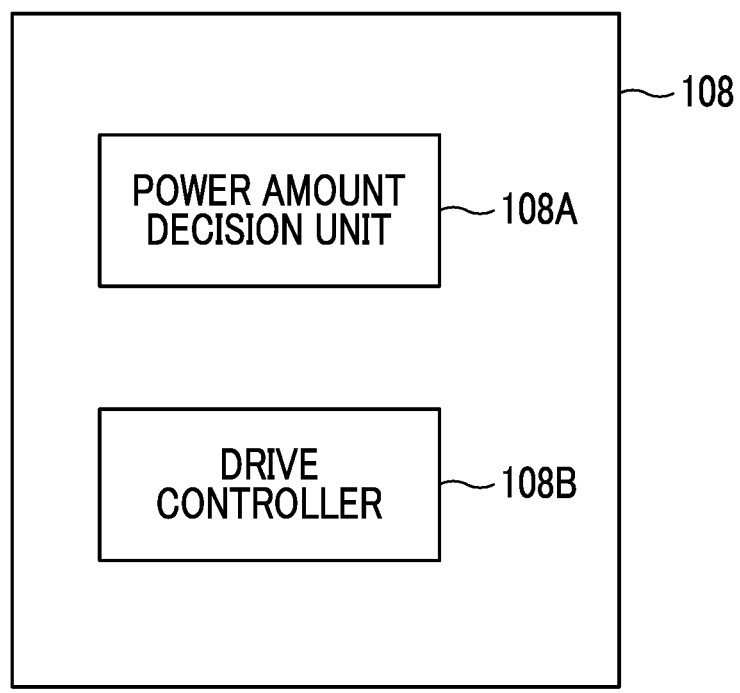
FIG. 7 is a functional block diagram of a system controller 108 shown in FIG. 1.

FIG. 7 is a functional block diagram of the system controller 108 shown in FIG. 1.

The system controller 108 functions as a controller including a power amount decision unit 108A and a drive controller 108B by executing the image shake correction program. The power amount decision unit 108A and the drive controller 108B may be constituted by different processors or may be constituted by one processor.

The power amount decision unit 108A decides a power amount to be supplied to each of the first VCM, the second VCM, and the third VCM for moving the movable member 2 to the target position.

The power amount decision unit 108A decides the power amount to be supplied to each of the first VCM, the second VCM, and the third VCM such that the movable member 2 can move to the target position with a minimum movement amount and a maximum speed.

Hereinafter, the power amount to be supplied to the first VCM in order to drive the first VCM is referred to as a first power amount. The power amount to be supplied to the second VCM in order to drive the second VCM is referred to as a second power amount. The power amount to be supplied to the third VCM in order to drive the third VCM is referred to as a third power amount.

The ROM of the memory 109 shown in FIG. 1 stores data of a set of the first power amount, the second power amount, and the third power amount for a combination of the position of the movable member 2 and the target position in advance.

The power amount decision unit 108A detects the position of the movable member 2 based on the detection signals of the X-axis position detection Hall element H1, the Y-axis rotation position detection Hall element H2, and the Y-axis rotation position detection Hall element H3, and decides the first power amount, the second power amount, and the third power amount based on the detected position, the target position, and the data.

The drive controller 108B selectively performs any one of a first control, a second control, and a third control, and moves the movable member 2 to the target position by supplying the power to each of the first VCM, the second VCM, and the third VCM.

The first control and the second control is executed in a case where a total value of the first power amount, the second power amount, and the third power amount decided by the power amount decision unit 108A exceeds a total power amount allowed for driving the image shake correction mechanism 3. The third control is executed in a case where the total value is equal to or smaller than the total power amount.

The total power amount allowed for driving the image shake correction mechanism 3 refers to the power amount to be distributed as a power of the power to be supplied from a battery of the digital camera 100 which is necessary for driving the image shake correction mechanism 3, and is changed depending on a battery remaining amount or an operation situation of the digital camera 100.

The first control is a control for reducing the total value of the first power amount, the second power amount, and the third power amount while maintaining a ratio of the first power amount, the second power amount, and the third power amount decided by the power amount decision unit 108A, performing control such that this total value is equal to or smaller than the total power amount (is preferably equal to the total power amount), and supplying the first power amount after the reduction, second power amount, and third power amount to the first VCM, the second VCM, and the third VCM.

The second control is a control for reducing at least one of two power amounts except for the minimum power amount of the first power amount, the second power amount, and the third power amount decided by the power amount decision unit 108A, performing control such that the total value of the first power amount, the second power amount, and the third power amount is equal to or smaller than the allowable total power amount (is preferably equal to the total power amount), and supplying the first power amount, the second power amount, and the third power amount after the reduction to the first VCM, the second VCM, and the third VCM.

The third control is a control for supplying the first power amount, the second power amount, and the third power amount decided by the power amount decision unit 108A to the first VCM, the second VCM, and the third VCM with no change.

Figure 8:
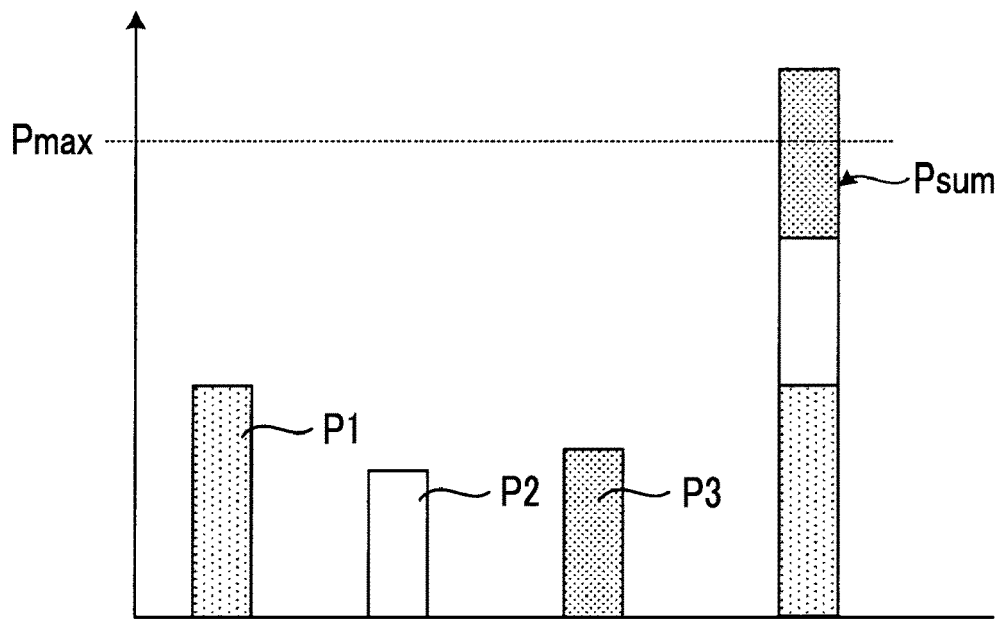
FIG. 8 is a schematic diagram for describing a content of a first control performed by a drive controller 108B.
Figure 8:
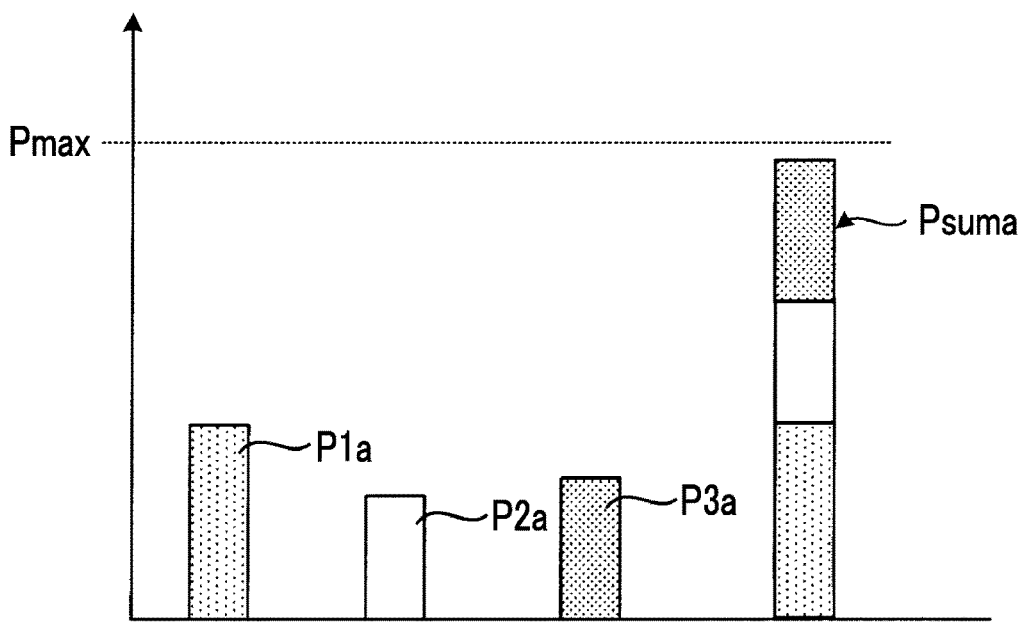

FIG. 8 is a schematic diagram for describing the content of the first control performed by the drive controller 108B.

A first power amount P1, a second power amount P2, and a third power amount P3 decided by the power amount decision unit 108A, and a total value Psum of the first power amount P1, the second power amount P2, and the third power amount P3 are shown at an upper part of FIG. 8. In the example of FIG. 8, the total value Psum exceeds an allowable total power amount Pmax.

In a case where the first control is performed, the drive controller 108B multiplies each of the first power amount P1, the second power amount P2, and the third power amount P3 shown at the upper part of FIG. 8 by a coefficient $\alpha$ which is large 0 and is smaller than 1.

A first power amount P1$a$ obtained by multiplying the first power amount P1 by the coefficient $\alpha$, a second power amount P2$a$ obtained by multiplying the second power amount P2 by the coefficient $\alpha$, and a third power amount P3$a$ obtained by multiplying the third power amount P3 by the coefficient $\alpha$ are shown at a lower part of FIG. 8.

As shown at the lower part of FIG. 8, the drive controller 108B sets the coefficient $\alpha$ such that a total value Psuma of the first power amount P1$a$, the second power amount P2$a$, and the third power amount P3$a$ is equal to or smaller than the total power amount Pmax.

For example, the drive controller 108B sets, as the coefficient $\alpha$, a value obtained by dividing the total power amount Pmax by the total value Psum. Alternatively, the coefficient $\alpha$ may be obtained in advance for each combination of the total power amount Pmax and the total value Psum, and may be stored in the ROM of the memory 109. The coefficient $\alpha$ corresponding to this combination may be read out from the ROM and may be set.

Figure 9:
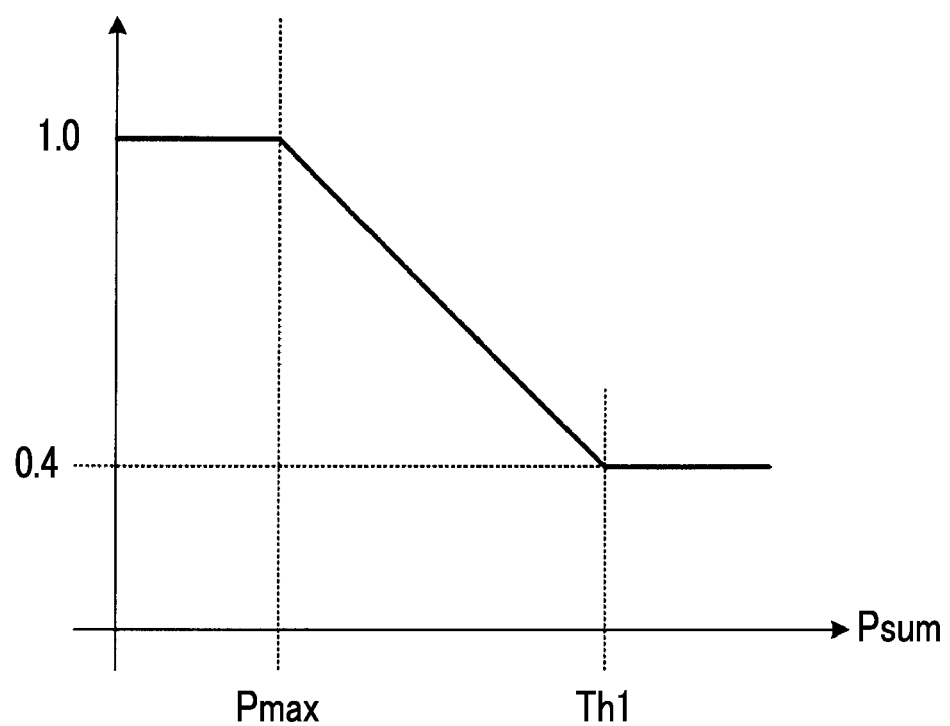
FIG. 9 is a diagram illustrating an example of a coefficient α.

FIG. 9 is a diagram illustrating an example of the coefficient $\alpha$.

In the example shown in FIG. 9, the coefficient $\alpha$ is 1 in a case where the total value Psum is equal to or smaller than the total power amount Pmax. In a case where the total value Psum exceeds the total power amount Pmax, the coefficient $\alpha$ is a value inversely proportional to the total value Psum. In a case where the total value Psum is equal to or larger than a threshold value Th1, the coefficient $\alpha$ is fixed at 0.4.

A lower limit value of the coefficient $\alpha$ is set such that a value obtained by multiplying the first power amount P1 by the coefficient $\alpha$ having this lower limit value is equal to or larger than the minimum power amount required for moving the movable member 2 by the first VCM, a value obtained by multiplying the second power amount P2 by the coefficient $\alpha$ having this lower limit value is equal to or larger than the minimum power amount required for moving the movable member 2 by the second VCM, and a value obtained by multiplying the third power amount P3 by the coefficient $\alpha$ having this lower limit value is equal to or larger than the minimum power amount required for moving the movable member 2 by the third VCM.

In a case where the first VCM, the second VCM, and the third VCM are driven by the first power amount P1, the second power amount P2, and the third power amount P3 shown at the upper part of FIG. 8, the movable member 2 can be moved at the highest speed.

Meanwhile, in a case where the first VCM, the second VCM, and the third VCM are driven by the first power amount P1a, the second power amount P2a, and the third power amount P3a shown at the lower part of FIG. 8, a time required for the movable member 2 to reach the target position is longer than in the case of the upper part, but power consumption required for moving the movable member 2 can be accordingly reduced.

Figure 10:
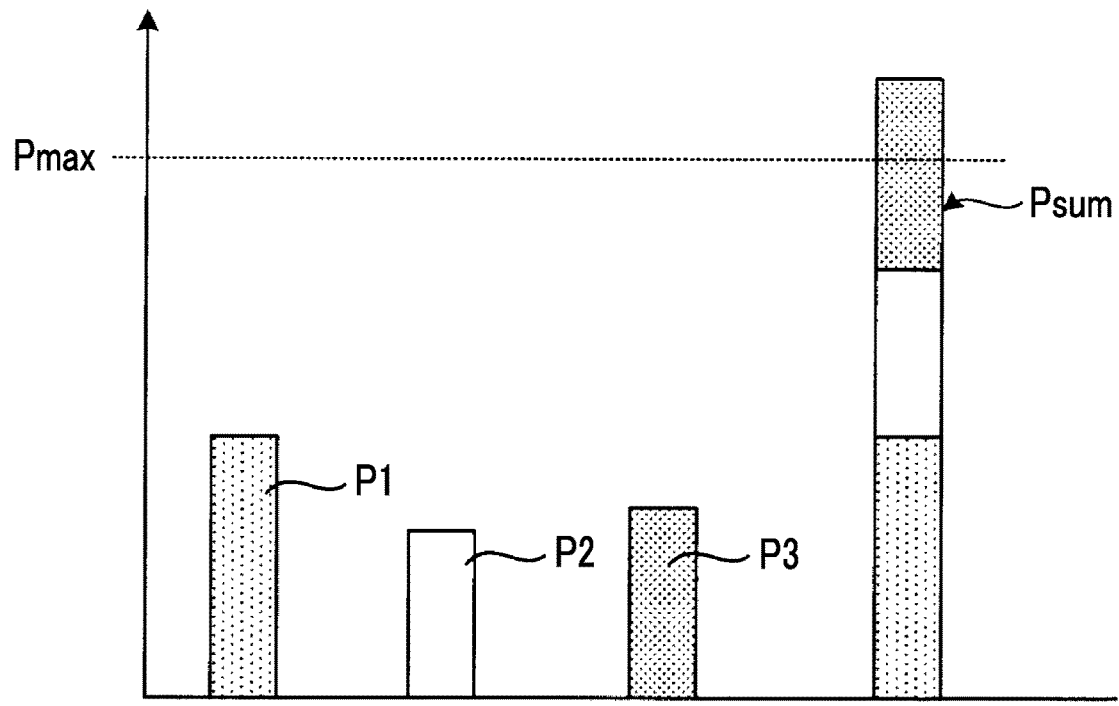
FIG. 10 is a schematic diagram for describing a content of a second control performed by a drive controller 108B.
Figure 10:
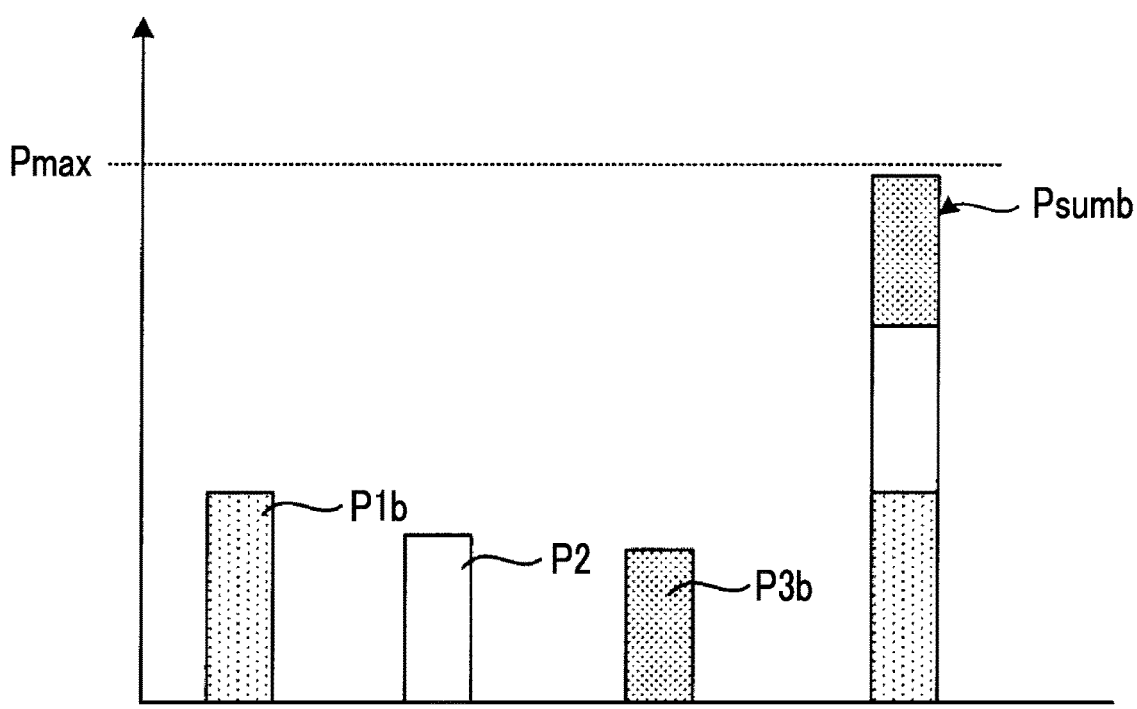

FIG. 10 is a schematic diagram for describing the content of the second control performed by the drive controller 108B.

The first power amount P1, the second power amount P2, and the third power amount P3 decided by the power amount decision unit 108A, and the total value Psum of the first power amount P1, the second power amount P2, and the third power amount P3 are shown at an upper part of FIG. 10. In the example of FIG. 10, the total value Psum exceeds the total power amount Pmax.

In a case where the second control is performed, the drive controller 108B obtains a first power amount P1b and a third power amount P3b by multiplying each of the first power amount P1 and the third power amount P3 other than the second power amount P2 which is the minimum power amount among the first power amount P1, the second power amount P2, and the third power amount P3 by a coefficient β as shown at a lower part of FIG. 10.

The coefficient β is set to a value which is larger than 0 and is smaller than 1, and is set such that a total value Psumb of the first power amount P1b, the second power amount P2, and the third power amount P3b is equal to or smaller than the total power amount Pmax (is preferably equal to the total power amount Pmax).

A lower limit value of the coefficient β is set such that a value obtained by multiplying the first power amount P1 by the coefficient β having this lower limit value is equal to or larger than the minimum power amount required for moving the movable member 2 by the first VCM, a value obtained by multiplying the second power amount P2 by the coefficient β having this lower limit value is equal to or larger than the minimum power amount required for moving the movable member 2 by the second VCM, and a value obtained by multiplying the third power amount P3 by the coefficient β having this lower limit value is equal to or larger than the minimum power amount required for moving the movable member 2 by the third VCM.

In the example of FIG. 10, each of the first power amount P1 and the third power amount P3 is multiplied by the coefficient β, but the total value Psumb may be equal to or smaller than the total power amount Pmax by multiplying any one of the first power amount P1 and the third power amount P3 by the coefficient β.

In the example of FIG. 10, since the first power amount P1 of the first power amount P1 and the third power amount P3 is larger, there is much room for reducing the value. Therefore, the total value Psumb may be equal to or smaller than the total power amount Pmax by multiplying only the first power amount P1 by the coefficient β.

The first control and the second control have the following advantages.

In the first control, the ratio between the power amounts to be supplied to the first VCM, the second VCM, and the third VCM is maintained at an optimum ratio decided by the power amount decision unit 108A. Therefore, compared to a case where the second control is performed, it is possible to stabilize the movable member 2 by eliminate unnecessary movement of the movable member, and it is possible to prevent occurrence of the shake of the captured image in a case where the movable member 2 moves to the target position. Therefore, the first control is effective in a situation in which the quality of the captured image is regarded as important.

In the second control, the minimum power amount of the power amounts to be supplied to the first VCM, the second VCM, and the third VCM is not changed, and the other power amounts are changed to small values. Thus, compared with a case where the first control is performed, it is possible to prevent the moving speed of the movable member 2 from being greatly reduced. Therefore, the second control is effective in a situation in which the responsiveness of the image shake correction is regarded as important.

Figure 11:
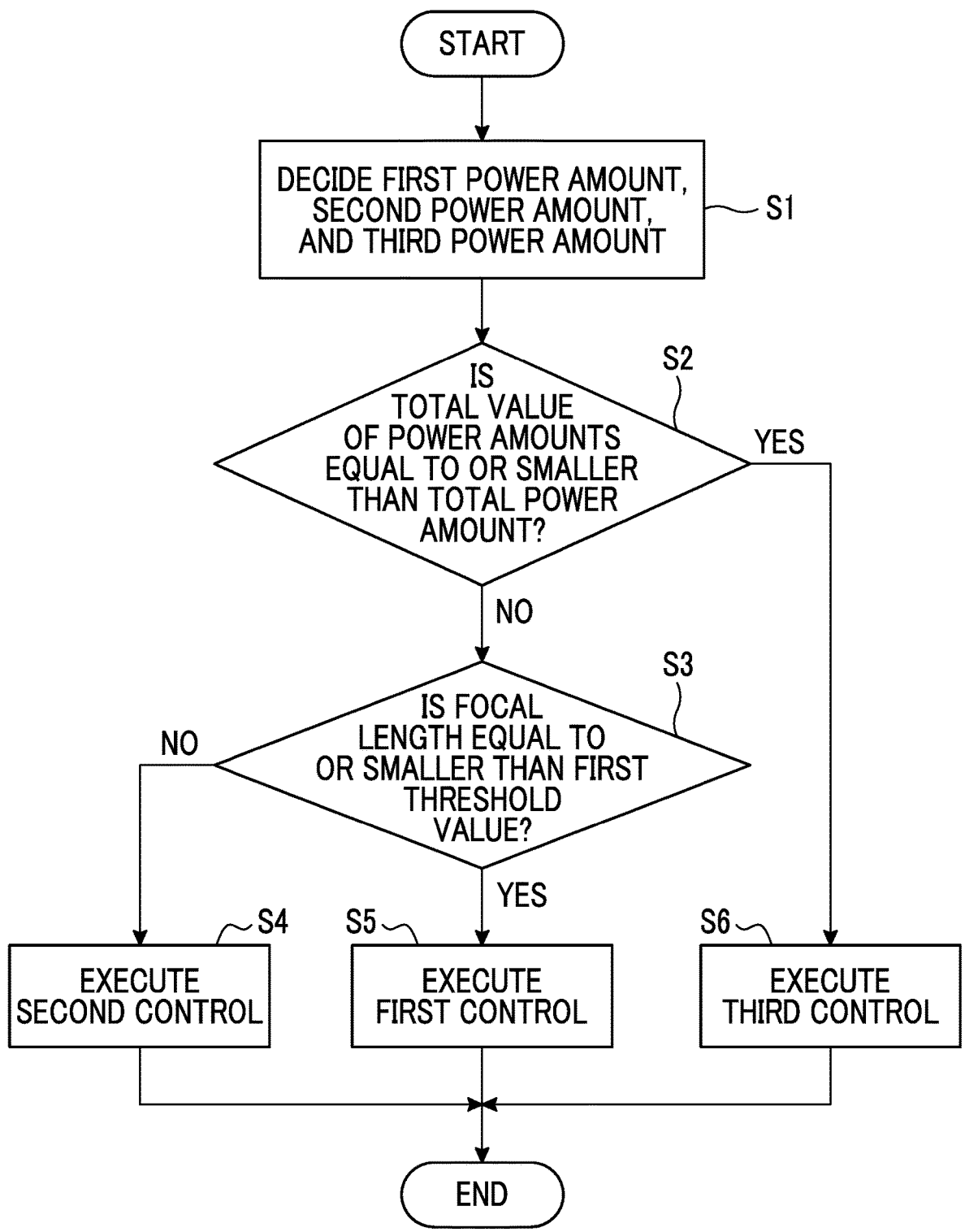
FIG. 11 is a flowchart for describing an operation of the system controller 108 of the digital camera 100 shown in FIG. 1.

FIG. 11 is a flowchart for describing an operation of the system controller 108 of the digital camera 100 shown in FIG. 1.

The power amount decision unit 108A detects the position of the movable member 2 based on the detection signals of the X-axis position detection Hall element H1, the Y-axis rotation position detection Hall element H2, and the Y-axis rotation position detection Hall element H3, and decides the first power amount, the second power amount, and the third power amount based on the detected position, the target position of the movable member 2, and the data stored in the ROM (step S1).

Subsequently, the drive controller 108B determines whether or not the total value of the first power amount, the second power amount, and the third power amount decided in step S1 is equal to or smaller than the allowable total power amount (step S2).

In a case where the total value is equal to or smaller than the total power amount (step S2: YES), the drive controller 108B executes the third control (step S6).

In a case where the total value exceeds the total power amount (step S2: NO), the drive controller 108B obtains a focal length from information of a position of the zoom lens included in the imaging lens 101, and determines whether or not this focal length is equal to or smaller than a predetermined first threshold value (step S3).

In a case where the focal length is equal to or smaller than the first threshold value (step S3: YES), the drive controller 108B executes the first control (step S5).

In a case where the focal length exceeds the first threshold value (step S3: NO), the drive controller 108B executes the second control (step S4).

As described above, according to the digital camera 100, in a case where the total value of the power amounts decided by the power amount decision unit 108A exceeds the total power amount allowed at a point of time of the decision, the first control or the second control is performed. Thus, the quality of the captured image can be improved while reducing the power required for moving the movable member 2.

For example, in the case of wide-angle imaging, since the shake of the captured image caused by the movement of the digital camera 100 is reduced, in a case where the shake of the captured image is caused by the fact that the ratio between the power amounts is not maintained, the influence on the appearance is large. Therefore, as in the operation shown in FIG. 11, the first control is executed in the case of the wide-angle imaging (in a case where the determination of step S3 is YES), and thus, the shake of the captured image irrelevant to the movement of the digital camera 100 can be prevented from being caused. Accordingly, the quality of a captured image can be improved. In the case of the wide-angle imaging, the shake of the captured image is decreased, and a movement amount of the movable member 2 for correcting the shake tends to be decreased. Thus, even though the moving speed of the movable member 2 is reduced by the first control, the influence can be limited.

In the case of telephoto imaging, since the shake of the captured image caused by the movement of the digital camera 100 is increased, the movement amount of the movable member 2 for correcting the large shake tends to be increased. Since the shake of the captured image is increased, even though the shake of the captured image is caused by the fact that the ratio between the power amounts is not maintained, the influence on the appearance is small. Therefore, as in the operation shown in FIG. 11, in the case of the telephoto imaging (in a case where the determination of step S3 is NO), the shake of the captured image can be corrected at a high speed by executing the second control, and the quality of the captured image can be improved.

Figure 12:
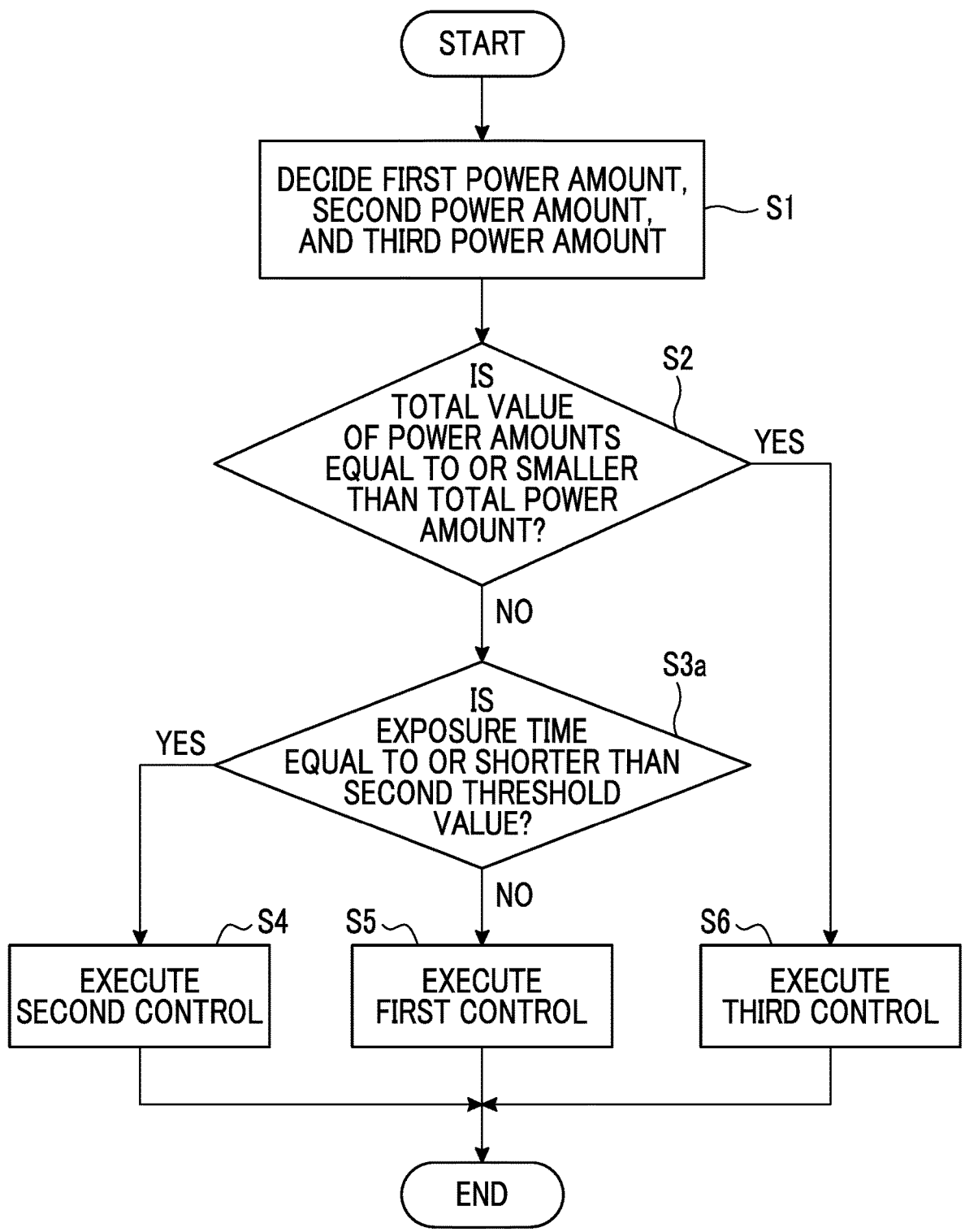
FIG. 12 is a flowchart for describing a first modification example of the operation of the system controller 108 of the digital camera 100 shown in FIG. 1.

FIG. 12 is a flowchart for describing a first modification example of the operation of the system controller 108 of the digital camera 100 shown in FIG. 1. The flowchart shown in FIG. 12 is the same as that of FIG. 11 except that step S3 is changed to step S3a. In FIG. 12, the same processing as those in FIG. 11 are denoted by the same references, and the description will be omitted.

In a case where the determination of step S2 is NO, the drive controller 108B acquires information on an exposure time of the imaging element 20, and determines whether or not this exposure time is equal to or shorter than a predetermined second threshold value (step S3a).

The drive controller 108B performs the processing of step S4 in a case where the exposure time is equal to or shorter than the second threshold value (step S3a: YES), and performs the processing of step S5 in a case where the exposure time exceeds the second threshold value (step S3a: NO).

In a case where the exposure time is long, it is important to correct the shake of the captured image. Therefore, the quality of the captured image can be improved by executing the first control as in the operation shown in FIG. 12. In a case where the exposure time is long, even though the moving speed of the movable member 2 is reduced by the first control, since a time required for the image shake correction is sufficiently ensured, the influence can be limited.

Meanwhile, in a case where the exposure time is short, the time required for image shake correction is limited. Therefore, the shake of the captured image can be corrected at a high speed by executing the second control as in the operation shown in FIG. 12, and the quality of the captured image can be improved.

Figure 13:
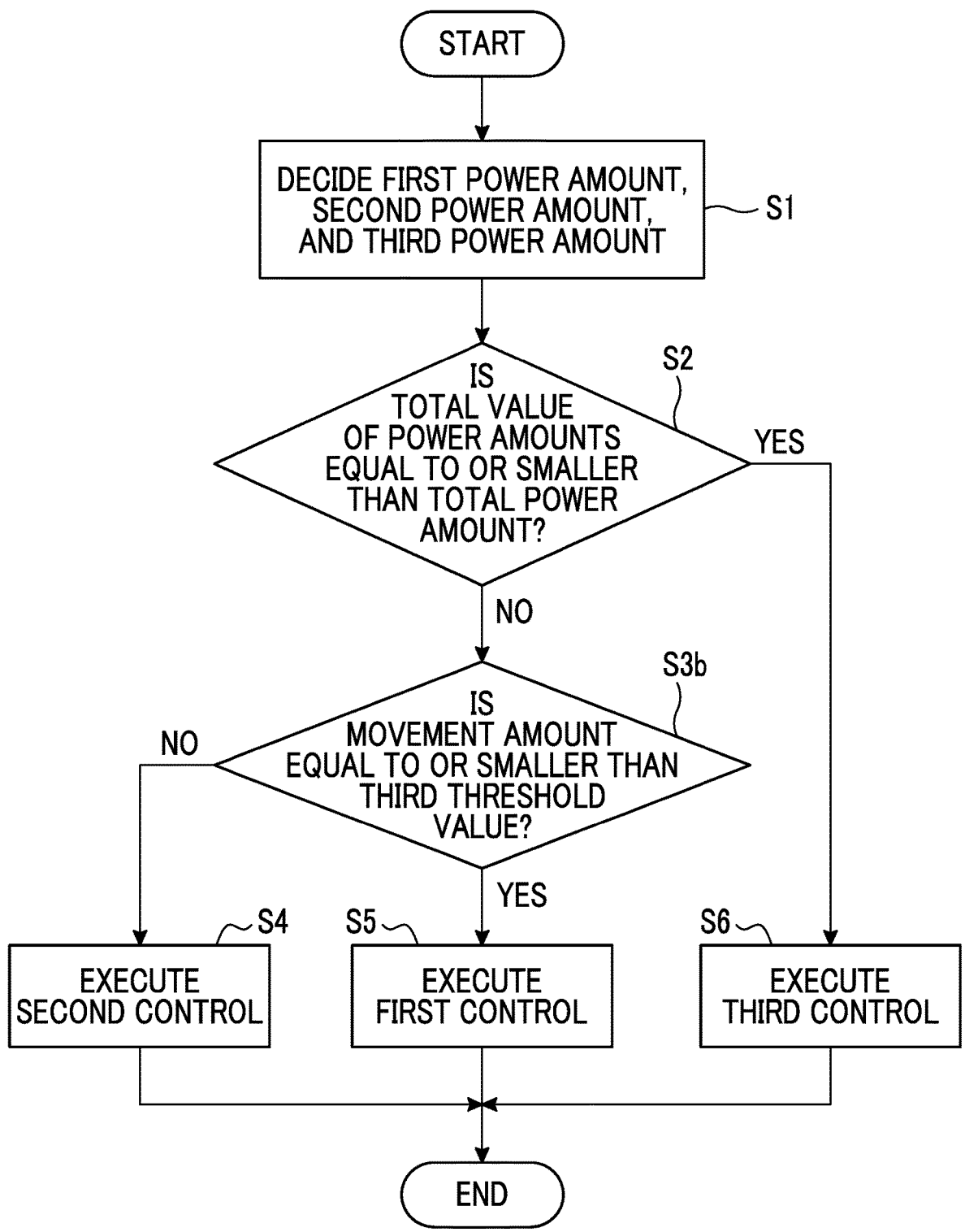
FIG. 13 is a flowchart for describing a second modification example of the operation of the system controller 108 of the digital camera 100 shown in FIG. 1.

FIG. 13 is a flowchart for describing a second modification example of the operation of the system controller 108 of the digital camera 100 shown in FIG. 1. The flowchart shown in FIG. 13 is the same as that of FIG. 11 except that step S3 is changed to step S3b. In FIG. 13, the same processing as those in FIG. 11 are denoted by the same references, and description thereof will be omitted.

In a case where the determination of step S2 is NO, the drive controller 108B calculates the movement amount of the digital camera 100 based on detection information of the motion detection sensor 106. The movement amount is specifically a change amount of the direction of the optical axis K, and becomes a large value in a case where the digital camera 100 is panned.

The drive controller 108B determines whether or not the calculated movement amount of the digital camera 100 is equal to or smaller than a predetermined third threshold value (step S3b).

The drive controller 108B performs the processing of step S5 in a case where the movement amount is equal to or smaller than the third threshold value (step S3b: YES), and performs the processing of step S4 in a case where the movement amount exceeds the third threshold value (step S3b: NO).

In a case where the movement amount of the digital camera 100 is small, there is a high possibility that a user is observing a live view image. Therefore, the quality of the captured image can be improved by executing the first control as shown in FIG. 13.

Meanwhile, in a case where the movement amount of the digital camera 100 is large, there is a low possibility that the user is observing the live view image. Thus, it is possible to improve the quality of the captured image after the digital camera 100 is stopped by giving priority to the responsiveness of the image shake correction by performing the second control as shown in FIG. 13.

Although the image shake correction mechanism 3 rotates the movable member 2 in the direction θ about the center P of the light receiving surface 20a, the position of the rotation center of the movable member 2 is not limited thereto, and any one point on the light receiving surface 20a may be used.

Although the image shake correction mechanism 3 performs the image shake correction by moving the movable member 2 in three directions of the direction X, the direction Y, and the direction θ, the image shake correction mechanism may perform the image shake correction by moving the movable member 2 in two directions of the direction X and the direction Y.

For example, in a case where the movable member 2 is not moved in the direction θ, the pair of the Y-axis rotation position detection magnet Mh2 and the Y-axis rotation position detection Hall element H2 may be removed, and the pair of the X-axis rotation drive magnet Mv1 and the X-axis rotation drive coil C1 may be removed.

In the configuration in which the movable member 2 can also move in the direction θ as in the image shake correction mechanism 3, in a case where the ratio between the power amounts is not optimized, the rotation of the movable member 2 in the direction θ is easily generated in the procedure of moving the movable member 2 to the target position. Therefore, the configuration of the drive controller 108B that performs the first control described above is particularly effective.

Although the image shake correction mechanism 3 corrects image shake by moving the imaging element 20, the image shake correction mechanism may be a mechanism that corrects image shake by moving, as the movable unit, a correction lens included in the imaging lens 101. In this case, a plurality of drive units (VCMs) for moving the lens may be controlled by the methods shown in FIGS. 11 to 13.

The image shake correction mechanism 3 may be a mechanism that corrects the image shake by moving, as the movable unit, the imaging element 20 and the correction lens included in the imaging lens 101. In this case, a plurality of drive units (VCMs) for moving the lens and a plurality of drive units (VCMs) for moving the imaging element may be controlled by the methods shown in FIGS. 11 to 13.

Figure 14:
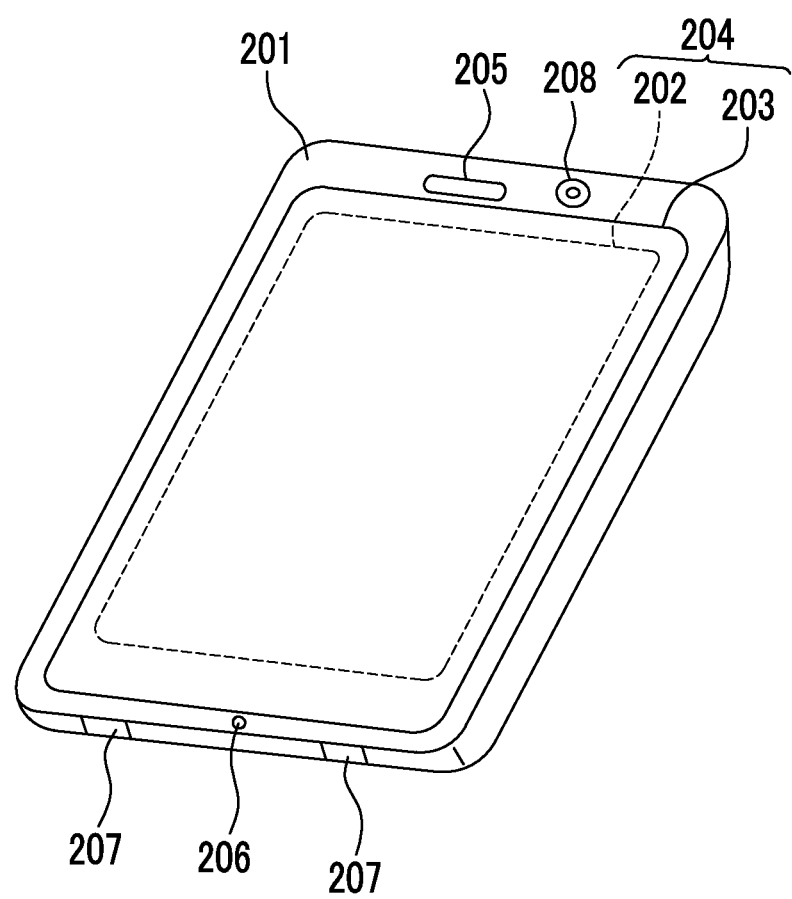
FIG. 14 shows an appearance of a smartphone 200 that is an embodiment of the imaging device of the present invention.

FIG. 14 shows an appearance of a smartphone 200 that is an embodiment of the imaging device of the present invention.

A smartphone 200 shown in FIG. 14 includes a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208. The configuration of the casing 201 is not limited thereto, and for example, a configuration in which the display surface and the input unit are independent can be employed, or a configuration having a folding structure or a slide mechanism can be employed.

Figure 15:
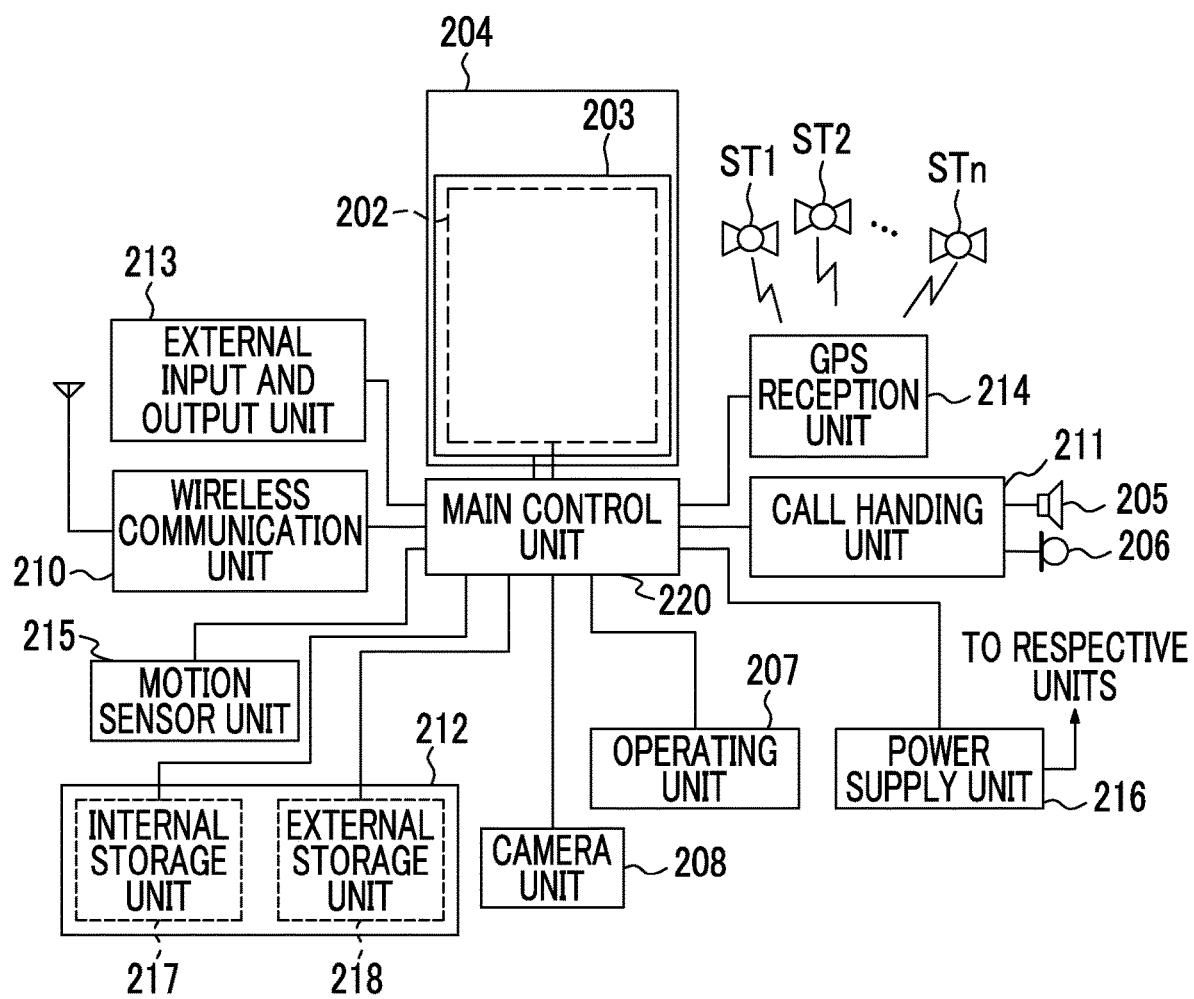
FIG. 15 is a block diagram showing a configuration of the smartphone 200 shown in FIG. 14.

FIG. 15 is a block diagram showing a configuration of the smartphone 200 shown in FIG. 14.

As shown in FIG. 15, the smartphone includes, as main components, a wireless communication unit 210, the display input unit 204, a call handling unit 211, the operation unit 207, the camera unit 208, a storage unit 212, an external input and output unit 213, a Global Positioning System (GPS) reception unit 214, a motion sensor unit 215, a power supply unit 216, and a main controller 220.

The smartphone 200 has, as a main function, a wireless communication function of performing mobile wireless communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transfers the images and information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 15, although it has been described that the display panel 202 and the operation panel 203 of the smartphone 200 shown as the embodiment of the imaging device of the present invention are integrally formed and constitute the display input unit 204, the operation panel 203 is disposed so as to completely cover the display panel 202. In a case where such an arrangement is adopted, the operation panel 203 may have a function of detecting the user operation even in a region outside the display panel 202. In other words, the operation panel 203 may have a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, and it is not necessary to match both the sizes. The operation panel 203 may have the outer edge portion and two sensitive regions which are inner portions other than the outer edge. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 14, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user. For example, as shown in FIG. 14, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone, and an external storage unit 218 having an external memory detachably attached via a slot.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or IEEE 1394) or a network (for example, Internet, wireless LAN, Bluetooth (registered trademark), radio frequency identification (RFID), Infrared Data Association (IrDA) (registered trademark), ultra wideband (UWB) (registered trademark), or ZigBee (registered trademark).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, or an earphone to be connected in a wired or wireless manner.

The external input and output unit 213 can transfer data transmitted from the external devices to the components in the smartphone 200 or can transmit data in the smartphone 200 to the external devices.

The GPS reception unit 214 receives GPS signals transmitted from GPS satellites ST1 to STn according to an instruction of the main controller 220, performs positioning calculation processing based on a plurality of received GPS signals, and detects the position of the smartphone 200 having latitude, longitude, and altitude. In a case where positional information can be acquired from the wireless communication unit 210 or the external input and output unit 213 (for example, a wireless LAN), the GPS reception unit 214 can detect the position by using the positional information.

For example, the motion sensor unit 215 comprises a three-axis acceleration sensor, and detects physical motion of the smartphone 200 according to an instruction of the main controller 220. The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200. The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212. The application processing function is, for example, an infrared communication function of controlling the external input and output unit 213 to perform data communication with a device facing the smartphone, an electronic mail function of transmitting and receiving electronic mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating electronic mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the aforementioned operations.

The camera unit 208 includes components other than the motion detection sensor 106, the system controller 108, and the image processing unit 107 of the digital camera 100 shown in FIG. 1. In the smartphone 200, the main controller 220 controls the image shake correction mechanism 3 based on information from the motion sensor unit 215 corresponding to the motion detection sensor 106 to perform image shake correction.

Captured image data generated by the camera unit 208 can be stored in the storage unit 212 or can be output through the external input and output unit 213 or the wireless communication unit 210.

Although it has been described in the smartphone 200 shown in FIG. 14 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS reception unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a motion picture may be attached with positional information acquired by the GPS reception unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

In the smartphone 200 having the aforementioned configuration, the image shake correction device has the aforementioned configuration, and thus, it is possible to obtain various effects.

As described above, the following items are disclosed in this specification.

(1) An image shake correction device comprises a plurality of drive units that moves a movable unit including at least one of an imaging element or a lens disposed in front of the imaging element in a plurality of directions along a light receiving surface of the imaging element, and a controller that controls the plurality of drive units. The controller comprises a power amount decision unit that decides power amounts to be supplied to the plurality of drive units for moving the movable unit to a target position, and a drive controller that performs a first control for reducing a total value of the power amounts decided by the power amount decision unit while maintaining a ratio between the power amounts decided by the power amount decision unit, and supplying the power amounts after the reduction to the drive units.

(2) In the image shake correction device according to (1), the drive controller performs the first control in a case where the total value exceeds a total power amount capable of being supplied to the plurality of drive units, and supplies the power amounts decided by the power amount decision unit to the drive units in a case where the total value is equal to or smaller than the total power amount.

(3) In the image shake correction device according to (2), the drive controller performs control such that the total value is equal to or smaller than the total power amount by reducing at least one of the power amounts except for a minimum power amount of the power amounts decided by the power amount decision unit, and performs any one of a second control for supplying the power amounts after the reduction to the drive units and the first control in a case where the total value exceeds the total power amount.

(4) In the image shake correction device according to (3), the drive controller decides whether to perform the first control or the second control based on an imaging condition of the imaging element.

(5) In the image shake correction device according to (4), the imaging condition is a focal length of the lens disposed in front of the imaging element.

(6) In the image shake correction device according to (5), the drive controller performs the first control in a case where the focal length is equal to or smaller than a first threshold value, and performs the second control in a case where the focal length exceeds the first threshold value.

(7) In the image shake correction device according to (4), the imaging condition is an exposure time of the imaging element.

(8) In the image shake correction device according to (7), the drive controller performs the second control in a case where the exposure time is equal to or smaller than a second threshold value, and performs the first control in a case where the exposure time exceeds the second threshold value.

(9) In the image shake correction device according to (3), the drive controller performs the first control in a case where a movement amount of the image shake correction device is equal to or smaller than a third threshold value, and performs the second control in a case where the movement amount exceeds the third threshold value.

(10) In the image shake correction device according to any one of (1) to (9), the movable unit includes the imaging element, the plurality of directions is three directions that include two directions which are along the light receiving surface and are perpendicular to each other, and a rotation direction with any point on the light receiving surface as a center, and the plurality of drive units includes at least three drive units.

(11) An imaging device comprises the image shake correction device according to any one of (1) to (10).

(12) An image shake correction method comprises a control step of controlling a plurality of drive units that moves a movable unit including at least one of an imaging element or a lens disposed in front of the imaging element in a plurality of directions along a light receiving surface of the imaging element. The control step comprises a power amount decision step of deciding power amounts to be supplied to the plurality of drive units for moving the movable unit to a target position, and a drive control step of performing a first control for reducing a total value of the power amounts decided in the power amount decision step while maintaining a ratio between the power amounts decided in the power amount decision step, and supplying the power amounts after the reduction to the drive units.

(13) In the image shake correction method according to (12), in the drive control step, the first control is performed in a case where the total value exceeds a total power amount capable of being supplied to the plurality of drive units, and the power amounts decided in the power amount decision step are supplied to the drive units in a case where the total value is equal to or smaller than the total power amount.

(14) In the image shake correction method according to (13), in the drive control step, control is performed such that the total value is equal to or smaller than the total power amount by reducing at least one of the power amounts except for a minimum power amount of the power amounts decided in the power amount decision step, and any one of a second control for supplying the power amounts after the reduction to the drive units or the first control is performed in a case where the total value exceeds the total power amount.

(15) In the image shake correction method according to (14), in the drive control step, whether to perform the first control or the second control is decided based on an imaging condition of the imaging element.

(16) In the image shake correction method according to (15), the imaging condition is a focal length of the lens disposed in front of the imaging element.

(17) In the image shake correction method according to (16), in the drive control step, the first control is performed in a case where the focal length of the lens disposed in front of the imaging element is equal to or smaller than a first threshold value, and the second control is performed in a case where the focal length exceeds the first threshold value.

(18) In the image shake correction method according to (15), the imaging condition is an exposure time of the imaging element.

(19) In the image shake correction method according to (18), in the drive control step, the second control is performed in a case where the exposure time is equal to or smaller than a second threshold value, and the first control is performed in a case where the exposure time exceeds the second threshold value.

(20) In the image shake correction method according to (14), in the drive control step, the first control is performed in a case where a movement amount in the image shake correction method is equal to or smaller than a third threshold value, and the second control is performed in a case where the movement amount exceeds the third threshold value.

(21) In the image shake correction method according to any one of (12) to (20), the movable unit includes the imaging element, the plurality of directions is three directions that include two directions which are along the light receiving surface and are perpendicular to each other, and a rotation direction with any point on the light receiving surface as a center, and the plurality of drive units includes at least three drive units.

(22) An image shake correction program causes a computer to execute a control step of controlling a plurality of drive units that moves a movable unit including at least one of an imaging element or a lens disposed in front of the imaging element in a plurality of directions along a light receiving surface of the imaging element. The control step comprises a power amount decision step of deciding power amounts to be supplied to the plurality of drive units for moving the movable unit to a target position, and a drive control step of performing a first control for reducing a total value of the power amounts decided in the power amount decision step while maintaining a ratio between the power amounts decided in the power amount decision step, and supplying the power amounts after the reduction to the drive units.

Although various embodiments have been described with reference to the drawings, the present invention is not limited to such examples. It is clear that those skilled in the art can conceive various changes or modifications within the scope described in the claims, and it should be understood that these changes and modifications belong to the technical scope of the present invention. Each component in the aforementioned embodiment may be arbitrarily combined without departing from the spirit of the invention.

This application is based on a Japanese patent application filed on Dec. 27, 2017 (Japanese Patent Application No. 2017-252255), the contents of which are incorporated herein by reference.

The present invention is highly convenient and effective by being applied to a digital camera such as a single-lens reflex camera or a mirrorless camera, an in-vehicle camera, a surveillance camera, or a smartphone.

EXPLANATION OF REFERENCES

100: digital camera
101: imaging lens
20: imaging element
3: image shake correction mechanism
104: AFE
105: imaging element drive unit
106: motion detection sensor
107: image processing unit
108: system controller
108A: power amount decision unit
108B: drive controller
109: memory
P1, P1$a$, P1$b$: first power amount
P2, P2$a$: second power amount
P3, P3$a$, P3$b$: third power amount
Psum, Psuma, Psumb: total value
K: optical axis
1: support member
1A: first support member
Mh1: X-axis position detection magnet
Mh2: Y-axis rotation position detection magnet
Mh3: Y-axis rotation position detection magnet
1$s$, 2$s$, 3$s$: S-pole
1$n$, 2$n$, 3$n$: N-pole
Mv1: X-axis rotation drive magnet
Mv2: X-axis rotation drive magnet
Mv3: Y-axis drive magnet
1B: second support member
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
24$a$, 24$b$, 24$c$: spring
20$a$: light receiving surface
P: center of light receiving surface
R: rotation axis
10: base
12, 14: yoke
13: coupling member
15$a$, 15$b$, 15$c$: flat surface
16$a$, 16$b$, 16$c$: hook
17$a$, 17$b$, 17$c$: projecting portion
18: yoke
19$a$: hole portion
19$b$, 19$c$: notch portion
22: base
23$a$, 23$b$, 23$c$: hook
29$a$, 29$b$, 29$c$: bottom surface
290$a$, 290$b$, 290$c$: recess portion
200: smartphone
201: casing
202: display panel
203: operation panel
204: display input unit
205: speaker
206: microphone
207: operation unit
208: camera unit
210: wireless communication unit
211: call handling unit
212: storage unit
213: external input and output unit
214: GPS reception unit
215: motion sensor unit
216: power supply unit
217: internal storage unit
218: external storage unit
220: main controller
ST1 to STn: GPS satellites

What is claimed is:

1. An image shake correction device comprising:
a plurality of motors that moves a movable unit including at least one of an imaging element or a lens arranged in association with the imaging element in a plurality of directions along a light receiving surface of the imaging element; and
a controller that controls the plurality of motors,
wherein the controller is configured to:
decide power amounts to be supplied to each of the plurality of motors for moving the movable unit to a target position, and
perform a first control for reducing a total value of the power amounts while maintaining a ratio among the power amounts, and for supplying the power amounts after the reduction to the motors, the controller is configured to perform the first control in a case where the total value exceeds a total power amount capable of being supplied to the plurality of motors, and supply the power amounts to the motors in a case where the total value is equal to or smaller than the total power amount, and the controller is configured to perform control such that the total value is equal to or smaller than the total power amount by reducing at least one of the power amounts except for a minimum power amount of the power amounts, and perform any one of a second control for supplying the power amounts after the reduction to the motors and the first control in a case where the total value exceeds the total power amount.

2. The image shake correction device according to claim 1, wherein the controller is configured to decide whether to perform the first control or the second control based on an imaging condition of the imaging element.

3. The image shake correction device according to claim 2, wherein the imaging condition is a focal length of the lens arranged in association with the imaging element.

4. The image shake correction device according to claim 3, wherein the controller is configured to perform the first control in a case where the focal length is equal to or smaller than a first threshold value, and perform the second control in a case where the focal length exceeds the first threshold value.

5. The image shake correction device according to claim 2, wherein the imaging condition is an exposure time of the imaging element.

6. The image shake correction device according to claim 5, wherein the controller is configured to perform the second control in a case where the exposure time is equal to or smaller than a second threshold value, and perform the first control in a case where the exposure time exceeds the second threshold value.

7. The image shake correction device according to claim 1, wherein the controller is configured to perform the first control in a case where a movement amount of the image shake correction device is equal to or smaller than a third threshold value, and perform the second control in a case where the movement amount exceeds the third threshold value.

8. The image shake correction device according to claim 1, wherein the movable unit includes the imaging element, the plurality of directions is three directions that include two directions which are along the light receiving surface and are perpendicular to each other, and a rotation direction with any point on the light receiving surface as a center, and the plurality of motors includes at least three motors.

9. An imaging device comprising the image shake correction device according to claim 1.

10. An image shake correction method comprising:

a control step of controlling a plurality of motors that moves a movable unit including at least one of an imaging element or a lens arranged in association with the imaging element in a plurality of directions along a light receiving surface of the imaging element, wherein the control step comprises a power amount decision step of deciding power amounts to be supplied to the plurality of motors for moving the movable unit to a target position, and a drive control step of performing a first control for reducing a total value of the power amounts decided in the power amount decision step while maintaining a ratio between the power amounts decided in the power amount decision step, and supplying the power amounts after the reduction to the motors, in the drive control step, the first control is performed in a case where the total value exceeds a total power amount capable of being supplied to the plurality of motors, and the power amounts decided in the power amount decision step are supplied to the motors in a case where the total value is equal to or smaller than the total power amount, and in the drive control step, control is performed such that the total value is equal to or smaller than the total power amount by reducing at least one of the power amounts except for a minimum power amount of the power amounts decided in the power amount decision step, and any one of a second control for supplying the power amounts after the reduction to the motors or the first control is performed in a case where the total value exceeds the total power amount.

11. The image shake correction method according to claim 10, wherein, in the drive control step, whether to perform the first control or the second control is decided based on an imaging condition of the imaging element.

12. The image shake correction method according to claim 11, wherein the imaging condition is a focal length of the lens arranged in association with the imaging element.

13. The image shake correction method according to claim 12, wherein, in the drive control step, the first control is performed in a case where the focal length of the lens arranged in association with the imaging element is equal to or smaller than a first threshold value, and the second control is performed in a case where the focal length exceeds the first threshold value.

14. The image shake correction method according to claim 11, wherein the imaging condition is an exposure time of the imaging element.

15. The image shake correction method according to claim 14, wherein, in the drive control step, the second control is performed in a case where the exposure time is equal to or smaller than a second threshold value, and the first control is performed in a case where the exposure time exceeds the second threshold value.

16. The image shake correction method according to claim 10, wherein, in the drive control step, the first control is performed in a case where a movement amount in the image shake correction method is equal to or smaller than a third threshold value, and the second control is performed in a case where the movement amount exceeds the third threshold value.

17. The image shake correction method according to claim 10, wherein the movable unit includes the imaging element, the plurality of directions is three directions that include two directions which are along the light receiving surface and are perpendicular to each other, and a rotation direction with any point on the light receiving surface as a center, and
the plurality of motors includes at least three motors.

* * * * *